US012090506B2

(12) United States Patent
Helmberger et al.

(10) Patent No.: US 12,090,506 B2
(45) Date of Patent: Sep. 17, 2024

(54) POWERED SPRAYER

(71) Applicant: TECHTRONIC CORDLESS GP, Anderson, SC (US)

(72) Inventors: Erin Helmberger, Dallas, TX (US); Ashley Amick, Seneca, SC (US); Adam Cunningham, Greenville, SC (US); Benjamin E. Montgomery, Anderson, SC (US); David Wiseman, Anderson, SC (US)

(73) Assignee: Techtronic Cordless GP, Anderson, SC (US)

( * ) Notice: Subject to any disclaimer, the term of this patent is extended or adjusted under 35 U.S.C. 154(b) by 266 days.

(21) Appl. No.: 17/373,940

(22) Filed: Jul. 13, 2021

(65) Prior Publication Data

US 2022/0016656 A1 Jan. 20, 2022

Related U.S. Application Data

(60) Provisional application No. 63/153,564, filed on Feb. 25, 2021, provisional application No. 63/054,265, (Continued)

(51) Int. Cl.

*B05B 1/16* (2006.01)
*B05B 9/04* (2006.01)
*B05B 9/08* (2006.01)

(52) U.S. Cl.

CPC .......... *B05B 9/0861* (2013.01); *B05B 1/1654* (2013.01); *B05B 1/169* (2013.01); *B05B 9/0426* (2013.01)

(58) Field of Classification Search

CPC ..... B05B 9/0861; B05B 9/0426; B05B 1/169; B05B 1/1654

(Continued)

(56) References Cited

U.S. PATENT DOCUMENTS 2,521,490 A 9/1950 Strauss
3,000,574 A 9/1961 Sedlacsik, Jr.

(Continued)

FOREIGN PATENT DOCUMENTS

CH 634490 A5 2/1983
CN 2502799 Y 7/2002

(Continued)

OTHER PUBLICATIONS

Partial European Search Report for Application No. 21185447.6 dated May 12, 2022 (13 pages).

*Primary Examiner* — Chee-Chong Lee

(74) *Attorney, Agent, or Firm* — Michael Best & Friedrich LLP

(57) ABSTRACT

A fluid sprayer includes a housing, a reservoir, a pump fluidly connected to the reservoir, and an adjustable nozzle assembly positioned downstream from the pump and configured to receive fluid discharged by the pump. The adjustable nozzle assembly includes a nozzle mount fixedly supported by the housing. The nozzle mount includes a conduit in fluid communication with the pump and a pressure seal assembly located within the conduit. The adjustable nozzle assembly also includes a wheel assembly rotatably coupled to the nozzle mount. The wheel assembly includes a selection wheel, a first nozzle coupled to the selection wheel, and a second nozzle coupled to the selection wheel. The wheel assembly is rotatable between a first position at which the first nozzle is located in fluid communication with the conduit and a second position at which the second nozzle is located in fluid communication with the conduit.

11 Claims, 20 Drawing Sheets

Related U.S. Application Data filed on Jul. 21, 2020, provisional application No. 63/051,661, filed on Jul. 14, 2020.

(58) Field of Classification Search
USPC .......................................................... 239/394
See application file for complete search history.

(56) References Cited

U.S. PATENT DOCUMENTS 3,112,885 A 12/1963 Bell et al.
3,181,798 A 5/1965 Wahlin et al.
3,195,819 A 7/1965 Tamotsu
3,462,082 A 8/1969 Everett
3,498,541 A 3/1970 Taylor, Jr. et al.
3,516,611 A 6/1970 Piggott
3,596,835 A 8/1971 Smith et al.
3,635,400 A 1/1972 Nord et al.
3,711,029 A 1/1973 Bartlett
3,737,099 A 6/1973 Shaffer
3,747,852 A 7/1973 Nord et al.
3,767,115 A 10/1973 Kozinski et al.
3,814,326 A 6/1974 Bartlett
3,876,154 A 4/1975 Griebel
3,913,844 A 10/1975 Petrovic
3,964,683 A 6/1976 Gimple
4,055,300 A 10/1977 Binoche
4,082,117 A * 4/1978 Peckham ............... A01G 25/16 307/115
4,088,268 A 5/1978 Vohringer
4,126,272 A 11/1978 Geberth, Jr.
4,165,836 A 8/1979 Eull
4,182,490 A 1/1980 Kennon
4,195,780 A 4/1980 Inglis
4,219,159 A 8/1980 Wesner
4,220,286 A 9/1980 Geberth, Jr.
4,221,334 A * 9/1980 Christopher ............ B05B 15/50 239/394
4,241,880 A 12/1980 Hastings
4,258,885 A 3/1981 Legeza
4,307,840 A 12/1981 Schulze et al.
4,324,361 A 4/1982 Moos et al.
4,335,851 A 6/1982 Hastings
4,361,283 A 11/1982 Hetherington et al.
4,437,610 A 3/1984 Huber et al.
4,465,236 A 8/1984 Calder
4,483,481 A 11/1984 Calder
4,484,707 A 11/1984 Calder
RE31,867 E 4/1985 Kennon
4,527,745 A 7/1985 Butterfield et al.
4,531,675 A 7/1985 Muck
4,537,355 A 8/1985 Calder
4,572,438 A 2/1986 Traylor
4,638,951 A 1/1987 Gabriel
4,651,932 A 3/1987 Huber et al.
4,660,774 A 4/1987 Kwok et al.
4,687,140 A 8/1987 Hasegawa
4,702,420 A 10/1987 Rath
4,715,537 A 12/1987 Calder
4,757,947 A 7/1988 Calder
4,810,897 A * 3/1989 Shotey ................... H05K 5/061 174/561
4,830,281 A 5/1989 Calder
4,838,490 A 6/1989 Nissels
4,905,905 A 3/1990 Hufgard
4,915,303 A 4/1990 Hufgard
4,948,053 A 8/1990 Hufgard
4,993,642 A 2/1991 Hufgard
5,060,869 A 10/1991 Bekius
5,062,452 A * 11/1991 Johnson .............. F04B 53/1027 137/543.13
5,100,058 A 3/1992 Wei
5,178,330 A 1/1993 Rodgers
5,183,322 A 2/1993 Haruch
5,190,224 A 3/1993 Hamilton
5,221,218 A * 6/1993 Marach .................. H01R 13/26 439/637
5,279,461 A 1/1994 Darroch
5,284,299 A 2/1994 Medlock
5,294,053 A 3/1994 Perret, Jr.
RE34,608 E 5/1994 Hufgard
5,340,029 A 8/1994 Adams
5,368,237 A 11/1994 Fulkerson
5,421,518 A 6/1995 Robisch et al.
5,454,517 A 10/1995 Naemura
5,501,400 A 3/1996 Kuo
5,505,381 A 4/1996 Torntore
5,529,245 A 6/1996 Brown
5,598,978 A 2/1997 Wang
5,699,967 A 12/1997 Conatser et al.
5,722,597 A 3/1998 Guo
5,725,161 A 3/1998 Hartle
5,727,739 A 3/1998 Hamilton
5,755,384 A 5/1998 Foster et al.
5,765,753 A 6/1998 Kieffer
5,820,025 A 10/1998 Troudt
5,836,517 A 11/1998 Burns et al.
5,887,793 A 3/1999 Kieffer
5,893,522 A 4/1999 Kieffer
5,911,364 A 6/1999 Johnson et al.
5,922,131 A 7/1999 Haas
6,012,651 A 1/2000 Spitznagel
6,015,100 A 1/2000 Restive
6,085,996 A 7/2000 Culbertson et al.
6,098,902 A 8/2000 Culbertson et al.
6,123,272 A 9/2000 Havican et al.
6,158,624 A 12/2000 Grigg et al.
6,164,566 A 12/2000 Hui-Chen
6,213,410 B1 4/2001 Spitznagel
6,244,527 B1 6/2001 Ferrazza et al.
6,264,115 B1 7/2001 Liska et al.
6,390,386 B2 5/2002 Krohn et al.
6,398,134 B1 6/2002 Hickson et al.
6,425,536 B2 7/2002 Namura
6,460,783 B1 10/2002 Christopher
6,460,787 B1 10/2002 Hartle et al.
6,478,242 B1 11/2002 Knobbe et al.
6,527,200 B1 3/2003 Huang
6,561,438 B1 5/2003 Restive et al.
6,676,049 B2 1/2004 Van Der Steur
6,796,519 B1 9/2004 Knobbe et al.
6,877,681 B2 4/2005 Hartle et al.
6,935,577 B2 8/2005 Strong
7,080,795 B2 7/2006 Chen
7,159,797 B1 1/2007 Lammers
7,219,848 B2 5/2007 Sweeton
7,281,673 B2 10/2007 Burnworth et al.
7,370,814 B2 5/2008 Chih
7,389,941 B2 6/2008 Jackson
7,413,131 B2 8/2008 Blais
7,458,524 B2 12/2008 Prieto et al.
7,467,752 B2 12/2008 Sweeton
7,497,387 B2 3/2009 Strong
7,540,076 B2 6/2009 Blais
7,731,104 B2 6/2010 Peterson et al.
7,861,950 B2 1/2011 Rossner et al.
8,210,449 B2 7/2012 Peterson et al.
8,267,332 B1 9/2012 Jones et al.
8,360,345 B2 1/2013 Micheli
8,596,555 B2 12/2013 Thompson et al.
8,640,973 B2 2/2014 Gansebom
8,684,281 B2 4/2014 Micheli et al.
8,720,798 B2 5/2014 Lynn
8,800,886 B2 8/2014 Murdock, Jr. et al.
8,807,459 B2 8/2014 Andersen
8,827,183 B2 9/2014 Jones
8,840,046 B2 9/2014 Jones et al.
8,936,207 B2 1/2015 Swan et al.
8,960,570 B2 2/2015 Drozd et al.
9,010,658 B2 4/2015 Johnson et al.
9,016,599 B2 4/2015 Johnson et al.
9,085,005 B2 7/2015 Townsend
9,174,226 B2 11/2015 Su et al.
9,302,281 B2 4/2016 Micheli et al.

(56) References Cited

U.S. PATENT DOCUMENTS

| | | | |
|---|---|---|---|
| 9,358,561 | B2 | 6/2016 | Johnson et al. |
| 9,433,956 | B2 | 9/2016 | Drozd et al. |
| 9,492,832 | B2 | 11/2016 | Kim |
| 9,517,479 | B2 | 12/2016 | Hines et al. |
| 9,545,643 | B2 | 1/2017 | Thompson et al. |
| 9,546,037 | B1 | 1/2017 | Armes et al. |
| 9,604,234 | B2 | 3/2017 | Thompson et al. |
| 9,604,235 | B2 | 3/2017 | Thompson et al. |
| 9,630,196 | B2 | 4/2017 | Finstad et al. |
| 9,656,282 | B2 | 5/2017 | Lehmann et al. |
| 9,675,982 | B2 | 6/2017 | Becker et al. |
| 9,751,100 | B2 | 9/2017 | Joseph et al. |
| 9,821,126 | B2 | 11/2017 | Biggs, III et al. |
| 9,832,972 | B2 | 12/2017 | Lin et al. |
| 9,849,474 | B2 | 12/2017 | Mather et al. |
| 9,855,350 | B1 | 1/2018 | Dahlquist |
| 9,914,141 | B2 | 3/2018 | Thompson et al. |
| 10,081,024 | B1 | 9/2018 | Hong |
| 10,167,641 | B2 | 1/2019 | Kinne et al. |
| 10,286,413 | B2 | 5/2019 | Mcbride, Jr. et al. |
| 10,329,078 | B1 | 6/2019 | Alonso et al. |
| 10,342,934 | B2 | 7/2019 | Hong |
| 10,350,619 | B2 | 7/2019 | Kim et al. |
| 10,351,334 | B1 | 7/2019 | Dolezal et al. |
| 10,351,335 | B1 | 7/2019 | Alonso et al. |
| 10,493,473 | B2 | 12/2019 | Joseph et al. |
| 10,493,482 | B2 | 12/2019 | Su |
| 10,525,486 | B2 | 1/2020 | Becker et al. |
| 10,538,378 | B2 | 1/2020 | Dolezal et al. |
| 10,549,292 | B2 | 2/2020 | Dolezal et al. |
| 10,562,046 | B2 | 2/2020 | Jenkins et al. |
| 10,610,879 | B2 | 4/2020 | Duong et al. |
| 10,654,052 | B2 | 5/2020 | Fujiwara et al. |
| 2003/0042338 | A1 | 3/2003 | Dankert |
| 2003/0071144 | A1 | 4/2003 | Naemura |
| 2003/0080220 | A1 | 5/2003 | Mather et al. |
| 2005/0023374 | A1 | 2/2005 | Knobbe et al. |
| 2005/0031404 | A1 | 2/2005 | Tsai et al. |
| 2005/0045744 | A1 | 3/2005 | Wang |
| 2005/0116063 | A1 | 6/2005 | Wang |
| 2005/0150981 | A1 | 7/2005 | Strong |
| 2005/0189445 | A1 | 9/2005 | Hartle et al. |
| 2006/0118661 | A1 | 6/2006 | Hartle et al. |
| 2008/0017734 | A1 | 1/2008 | Micheli et al. |
| 2009/0121048 | A1 | 5/2009 | Noshima |
| 2009/0224073 | A1 | 9/2009 | Hsieh |
| 2010/0078499 | A1 | 4/2010 | Sulzer et al. |
| 2012/0325934 | A1 | 12/2012 | Delorme et al. |
| 2013/0020414 | A1 | 1/2013 | Thomason et al. |
| 2013/0037629 | A1 | 2/2013 | Boquet |
| 2014/0076996 | A1 | 3/2014 | Hayton et al. |
| 2014/0131474 | A1 | 5/2014 | Gansebom |
| 2014/0246516 | A1 | 9/2014 | Huang |
| 2014/0263686 | A1 | 9/2014 | Hedger et al. |
| 2015/0231652 | A1 | 8/2015 | Ulrich et al. |
| 2015/0273494 | A1 | 10/2015 | Koehne et al. |
| 2015/0330089 | A1 | 11/2015 | Finstad et al. |
| 2016/0199862 | A1 | 7/2016 | Poppe et al. |
| 2016/0236217 | A1 | 8/2016 | Jenkins |
| 2016/0303585 | A1 | 10/2016 | Wenzel et al. |
| 2017/0056899 | A1 | 3/2017 | Kim et al. |
| 2018/0001038 | A1 | 1/2018 | Biggs, III et al. |
| 2018/0043379 | A1 | 2/2018 | Gantenbein et al. |
| 2018/0049406 | A1 | 2/2018 | Lin et al. |
| 2018/0085763 | A1 | 3/2018 | Leckner |
| 2018/0169692 | A1 | 6/2018 | Olson et al. |
| 2018/0185855 | A1 | 7/2018 | Wenzel et al. |
| 2018/0207662 | A1 | 7/2018 | Norman et al. |
| 2018/0214897 | A1 | 8/2018 | Thompson et al. |
| 2019/0118193 | A1 | 4/2019 | Kim |
| 2019/0153623 | A1 | 5/2019 | Sugawara et al. |
| 2019/0283061 | A1 | 9/2019 | Qiao |
| 2019/0314835 | A1 | 10/2019 | Thackery et al. |
| 2020/0055071 | A1 | 2/2020 | Lam |
| 2020/0079578 | A1 | 3/2020 | Dolezal et al. |
| 2020/0139384 | A1 | 5/2020 | Becker et al. |
| 2020/0276595 | A1 | 9/2020 | Comstock et al. |
| 2020/0298253 | A1 | 9/2020 | Walters et al. |

FOREIGN PATENT DOCUMENTS

| | | | |
|---|---|---|---|
| CN | 2528543 | Y | 1/2003 |
| CN | 201105253 | Y | 8/2008 |
| CN | 201161216 | Y | 12/2008 |
| CN | 101632967 | A | 1/2010 |
| CN | 201482620 | U | 5/2010 |
| CN | 201586594 | U | 9/2010 |
| CN | 201603650 | U | 10/2010 |
| CN | 201644270 | U | 11/2010 |
| CN | 101961696 | A | 2/2011 |
| CN | 201791620 | U | 4/2011 |
| CN | 201791627 | U | 4/2011 |
| CN | 201807486 | U | 4/2011 |
| CN | 201832742 | U | 5/2011 |
| CN | 201913030 | U | 8/2011 |
| CN | 202097059 | U | 1/2012 |
| CN | 202238436 | U | 5/2012 |
| CN | 101992164 | B | 10/2012 |
| CN | 102179335 | B | 12/2012 |
| CN | 202725392 | U | 2/2013 |
| CN | 203155430 | U | 8/2013 |
| CN | 203170625 | U | 9/2013 |
| CN | 203264931 | U | 11/2013 |
| CN | 204093624 | U | 1/2015 |
| CN | 204503405 | U | 7/2015 |
| CN | 204685332 | U | 10/2015 |
| CN | 204746681 | U | 11/2015 |
| CN | 204953188 | U | 1/2016 |
| CN | 103170416 | B | 2/2016 |
| CN | 205074134 | U | 3/2016 |
| CN | 205084914 | U | 3/2016 |
| CN | 205253420 | U | 5/2016 |
| CN | 205380004 | U | 7/2016 |
| CN | 205462861 | U | 8/2016 |
| CN | 205462870 | U | 8/2016 |
| CN | 106391360 | A | 2/2017 |
| CN | 205926114 | U | 2/2017 |
| CN | 104001639 | B | 5/2017 |
| CN | 106694276 | A | 5/2017 |
| CN | 106824574 | A | 6/2017 |
| CN | 106881217 | A | 6/2017 |
| CN | 206325731 | U | 7/2017 |
| CN | 107029911 | A | 8/2017 |
| CN | 206415264 | U | 8/2017 |
| CN | 107244417 | A | 10/2017 |
| CN | 206661469 | U | 11/2017 |
| CN | 206716277 | U | 12/2017 |
| CN | 105382045 | B | 2/2018 |
| CN | 206965961 | U | 2/2018 |
| CN | 206996913 | U | 2/2018 |
| CN | 207086175 | U | 3/2018 |
| CN | 207126708 | U | 3/2018 |
| CN | 105834019 | B | 6/2018 |
| CN | 108187941 | A | 6/2018 |
| CN | 108325768 | A | 7/2018 |
| CN | 108339678 | A | 7/2018 |
| CN | 207735157 | U | 8/2018 |
| CN | 207786870 | U | 8/2018 |
| CN | 108480085 | A | 9/2018 |
| CN | 208161886 | U | 11/2018 |
| CN | 108940645 | A | 12/2018 |
| CN | 208244990 | U | 12/2018 |
| CN | 208494621 | U | 2/2019 |
| CN | 208711969 | U | 4/2019 |
| CN | 208757855 | U | 4/2019 |
| CN | 208853331 | U | 5/2019 |
| CN | 208878862 | U | 5/2019 |
| CN | 109876938 | A | 6/2019 |
| CN | 209076942 | U | 7/2019 |
| CN | 209393381 | U | 9/2019 |
| CN | 209646779 | U | 11/2019 |
| CN | 209901549 | U | 1/2020 |
| CN | 210083170 | U | 2/2020 |
| CN | 210357662 | U | 4/2020 |

(56) References Cited

FOREIGN PATENT DOCUMENTS

| | | | |
|---|---|---|---|
| CN | 210585458 | U | 5/2020 |
| CN | 111346750 | A | 6/2020 |
| CN | 210787841 | U | 6/2020 |
| CN | 210994873 | U | 7/2020 |
| CN | 108487604 | B | 8/2020 |
| CN | 211359275 | U | 8/2020 |
| CN | 211514925 | U | 9/2020 |
| CN | 211563406 | U | 9/2020 |
| CN | 111760690 | A | 10/2020 |
| CN | 211613130 | U | 10/2020 |
| DE | 1801166 | A1 | 4/1969 |
| DE | 2227933 | A1 | 1/1973 |
| DE | 2707663 | A1 | 8/1978 |
| DE | 3111295 | A1 | 10/1982 |
| DE | 3611516 | A1 | 10/1987 |
| DE | 19503495 | A1 | 8/1996 |
| DE | 29705444 | U1 | 4/1998 |
| DE | 19757240 | A1 | 8/1998 |
| DE | 19817244 | A1 | 11/1998 |
| DE | 10323256 | A1 | 12/2004 |
| DE | 202005001137 | U1 | 4/2005 |
| DE | 102010027391 | A1 | 8/2011 |
| DE | 102017206503 | A1 | 10/2018 |
| EP | 0227368 | A2 | 7/1987 |
| EP | 0337091 | B1 | 2/1994 |
| EP | 0567436 | B1 | 7/1995 |
| EP | 0804969 | A2 | 11/1997 |
| EP | 0645192 | B1 | 5/1999 |
| EP | 1728556 | B1 | 5/2009 |
| EP | 2460591 | B1 | 1/2019 |
| EP | 3381565 | B1 | 4/2020 |
| FR | 1384609 | A | 1/1965 |
| FR | 3035010 | A3 | 10/2016 |
| GB | 591609 | A | 8/1947 |
| GB | 1321468 | A | 6/1973 |
| GB | 1445029 | A | 8/1976 |
| GB | 1482084 | A | 8/1977 |
| GB | 2216040 | A | 10/1989 |
| WO | 0023198 | A1 | 4/2000 |
| WO | 2012097360 | A2 | 7/2012 |
| WO | WO2014201781 | A1 | 12/2014 |
| WO | 2016037074 | A1 | 3/2016 |
| WO | WO2016165738 | A1 | 10/2016 |
| WO | WO2020127997 | A1 | 6/2020 |
| WO | WO2020205758 | A1 | 10/2020 |

* cited by examiner

POWERED SPRAYER

CROSS-REFERENCE TO RELATED APPLICATIONS

This application claims priority to U.S. Provisional Patent Application No. 63/153,564, filed Feb. 25, 2021, and to U.S. Provisional Patent Application No. 63/054,265, filed Jul. 21, 2020, and to U.S. Provisional Patent Application No. 63/051,661, filed Jul. 14, 2020, the entire content of each of which is hereby incorporated by reference.

FIELD OF THE DISCLOSURE

The disclosure relates to fluid delivery devices, and more particularly to portable, battery-powered liquid sprayers.

BACKGROUND OF THE DISCLOSURE

Powered sprayers, such as foggers, misters, and the like, are commonly used to disperse liquid solutions onto surfaces in vapor, mist or fog form.

SUMMARY OF THE DISCLOSURE

The present disclosure provides, in one aspect, a fluid sprayer including a housing, a reservoir, and a pump fluidly connected to the reservoir, and an adjustable nozzle assembly positioned downstream from the pump and configured to receive fluid discharged from the pump. The adjustable nozzle assembly includes a nozzle mount fixedly supported by the housing. The nozzle mount includes a conduit in fluid communication with the pump, and a pressure seal assembly located within the conduit. The adjustable nozzle assembly also includes a wheel assembly rotatably coupled to the nozzle mount. The wheel assembly includes a selection wheel, a first nozzle coupled to the selection wheel, and a second nozzle coupled to the selection wheel. The wheel assembly is rotatable between a first position at which the first nozzle is located in fluid communication with the conduit, and a second position at which the second nozzle is located in fluid communication with the conduit. The pressure seal assembly maintains a seal between the conduit and the wheel assembly as the wheel assembly is rotated between the first position and the second position.

The present disclosure provides, in another aspect, a fluid sprayer including a housing, a reservoir, and a pump fluidly connected to the reservoir, and an adjustable nozzle assembly positioned downstream from the pump and configured to receive fluid discharged from the pump. The adjustable nozzle assembly includes a nozzle mount fixedly supported by the housing and including a conduit in fluid communication with the pump. The adjustable nozzle assembly also includes a wheel assembly rotatably coupled to the nozzle mount, the wheel assembly including a selection wheel, a first nozzle coupled to the selection wheel, and a second nozzle coupled to the selection wheel. The wheel assembly is rotatable between a first position at which the first nozzle is located in fluid communication with the conduit, and a second position at which the second nozzle is located in fluid communication with the conduit. The adjustable nozzle assembly also includes a switch assembly configured to selectively permit or prevent operation of the pump. The wheel assembly actuates the switch assembly to permit operation of the pump when the wheel assembly is located at the first position or the second position, and the switch assembly prevents operation of the pump when the wheel assembly is rotated out of the first position or the second position.

The present disclosure provides, in yet another aspect, a fluid sprayer including a housing, a reservoir, and a pump fluidly connected to the reservoir, and an adjustable nozzle assembly positioned downstream from the pump and configured to receive fluid discharged from the pump. The adjustable nozzle assembly includes a nozzle mount fixedly supported by the housing. The nozzle mount includes a nozzle body, a conduit in fluid communication with the pump, and a wheel hub rotatably coupled to the nozzle body and rotatable relative to the nozzle body about an axis. The adjustable nozzle assembly also includes a wheel assembly removably coupled to the wheel hub and rotatable with the wheel hub about the axis. The wheel assembly includes a selection wheel, a first nozzle coupled to the selection wheel, and a second nozzle coupled to the selection wheel. The wheel assembly is rotatable about the axis between a first position at which the first nozzle is located in fluid communication with the conduit, a second position at which the second nozzle is located in fluid communication with the conduit, and a third position at which the conduit is closed by the wheel hub. When the wheel assembly is located in the third position, the wheel assembly is removable from the nozzle mount.

The present disclosure provides, in yet another aspect, a fluid sprayer including a housing, a reservoir, a pump fluidly connected to the reservoir, and an adjustable nozzle assembly positioned downstream from the pump and configured to receive fluid discharged by the pump. The adjustable nozzle assembly includes a nozzle mount fixedly supported by the housing, the nozzle mount including a nozzle body and a conduit in fluid communication with the pump. The adjustable nozzle assembly also includes a nozzle brick removably coupled to the nozzle body and supporting a first nozzle and a second nozzle. The nozzle brick is slidable relative to the nozzle body along a linear axis between a first position at which the first nozzle is located in fluid communication with the conduit and a second position at which the second nozzle is located in fluid communication with the conduit.

Other aspects of the disclosure will become apparent by consideration of the detailed description and accompanying drawings.

Before any embodiments of the disclosure are explained in detail, it is to be understood that the disclosure is not limited in its application to the details of embodiment and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Figure 1A:
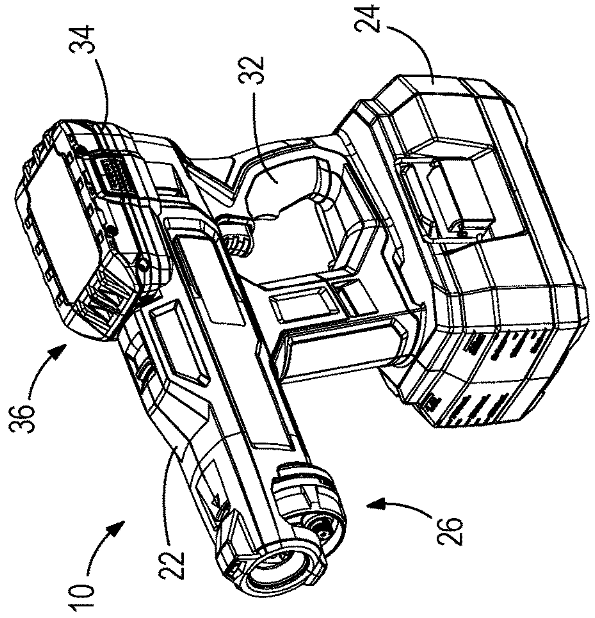
FIGS. 1A-1C are perspective views of portable, battery-powered liquid sprayers according to some embodiments of the disclosure.
Figure 1B:
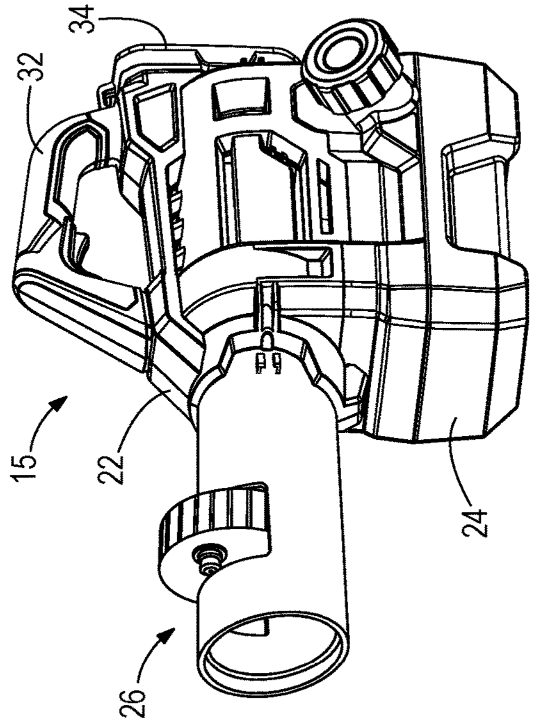
Figure 1C:
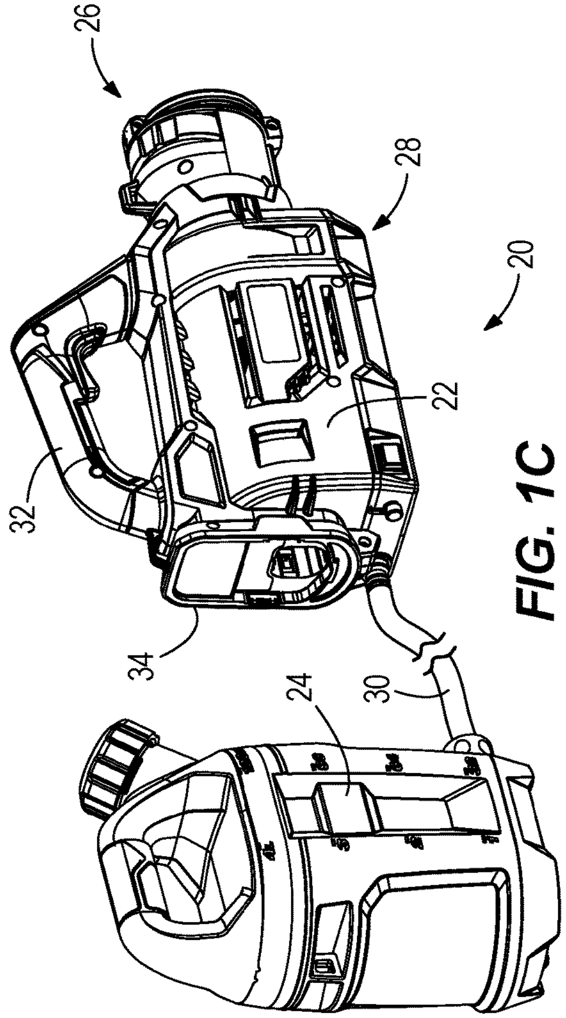

FIGS. 1A-1C illustrate various portable, battery-powered liquid sprayers 10, 15, and 20 according to some embodiments of the present disclosure. Each of the sprayers 10, 15, 20 includes a housing 22, a reservoir 24 to hold a liquid solution (e.g., a disinfecting solution), and a nozzle assembly 26 to spray out the solution. The sprayer 10 illustrated in FIG. 1A includes a removable reservoir 24 coupled to the housing 22 via latches. The sprayer 15 illustrated in FIG. 1B includes an integrated reservoir 24 affixed to the housing 22. The sprayer 20 illustrated in FIG. 1C includes a remote reservoir 24 that fluidly connects to a sprayer unit 28 via a hose 30. For each sprayer 10, 15, 20, the housing 22 defines a handle portion 32 and a battery receptacle 34 that selectively couples to a removable and rechargeable battery pack 36. As will be discussed in further detail below, the nozzle assembly 26 of each sprayer 10, 15, 20 is an adjustable and removable nozzle assembly 26 that allows the user to switch between different nozzles 38 that impart different spray characteristics to the spray (e.g., flow rate, spray pattern, spray droplet size, etc.).

Figure 2:
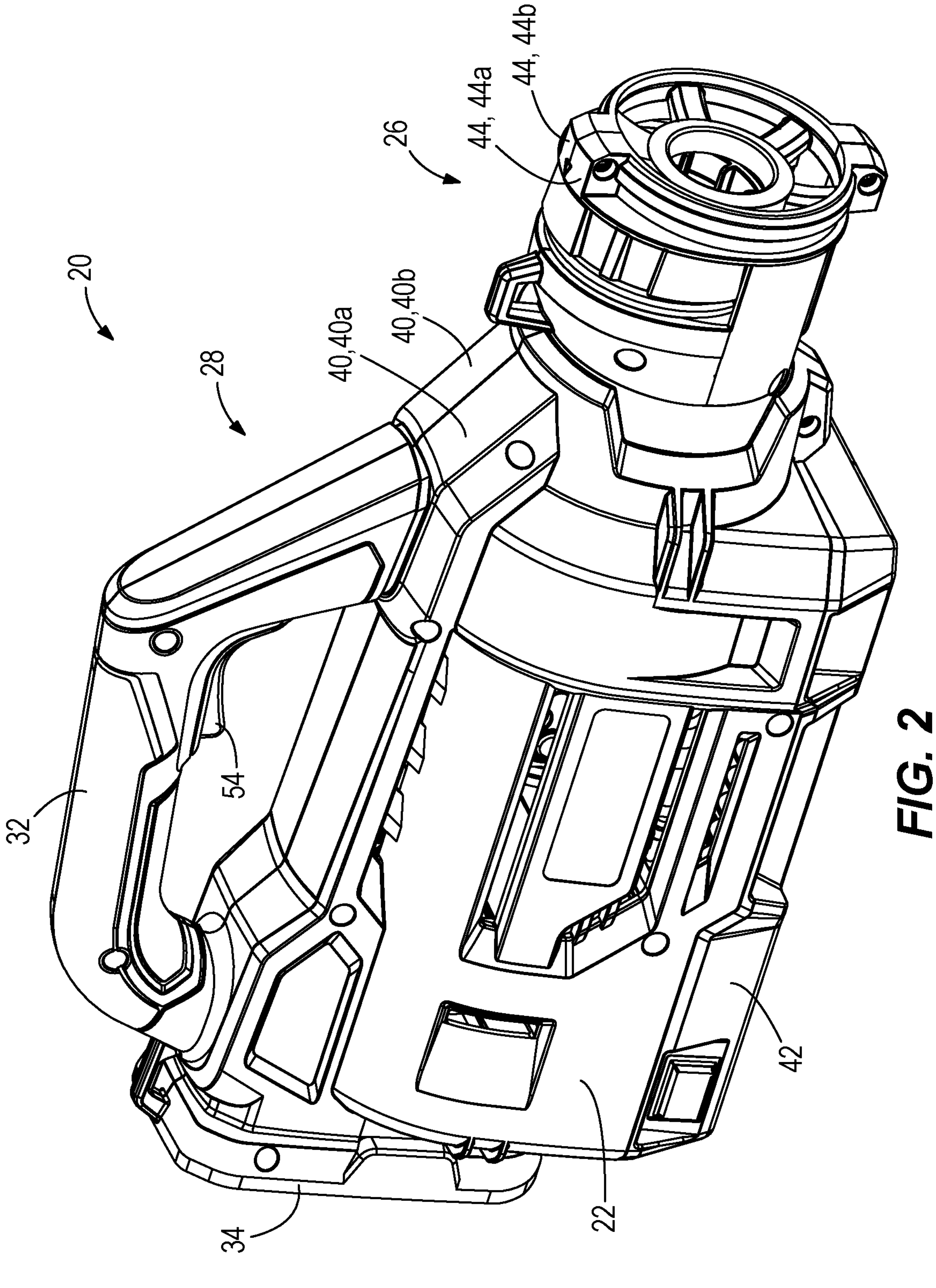
FIG. 2 is another perspective view of the sprayer of FIG. 1C.
Figure 3:
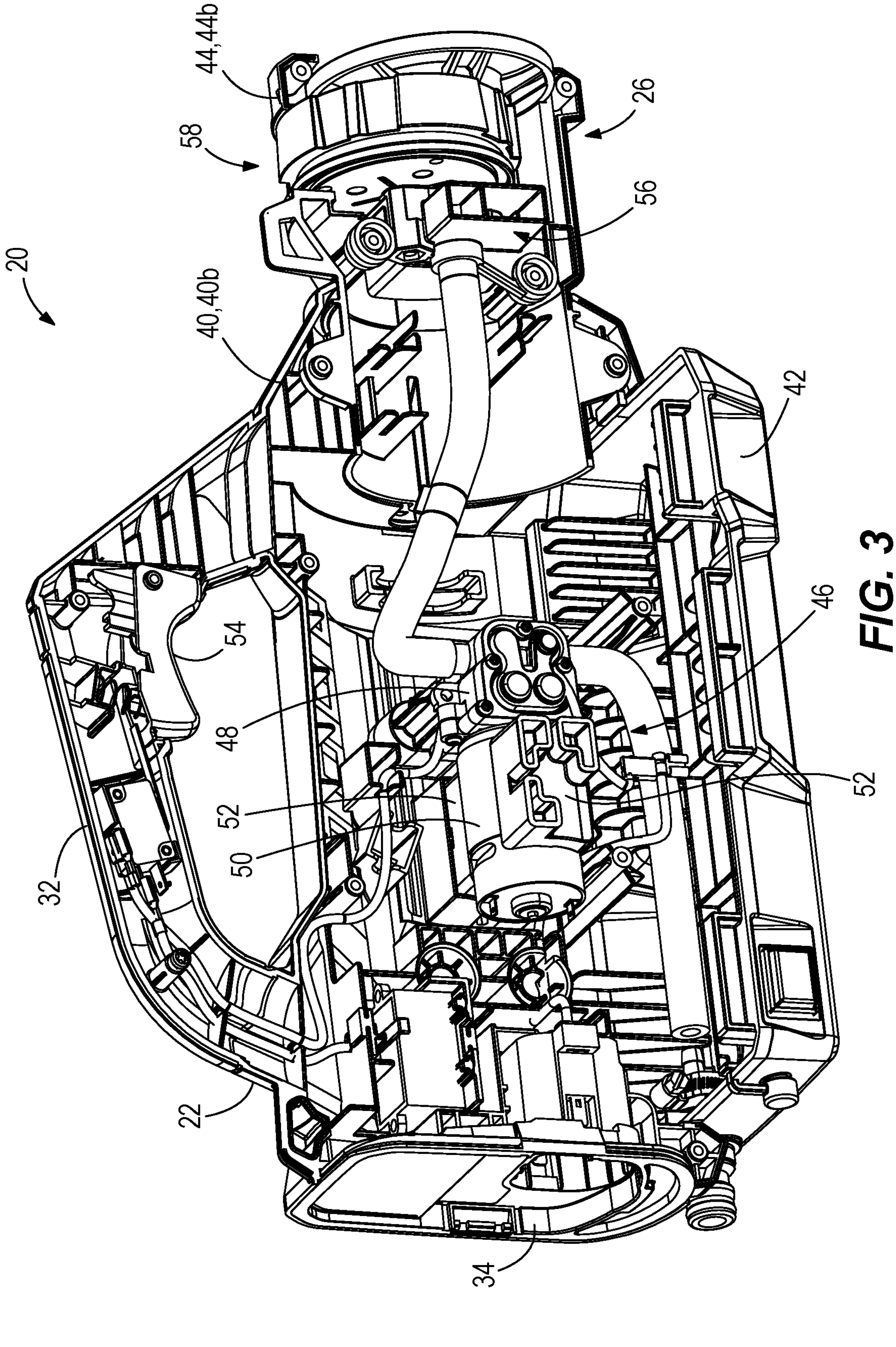
FIG. 3 is another perspective view of the sprayer of FIG. 1C with portions removed.
Figure 4:
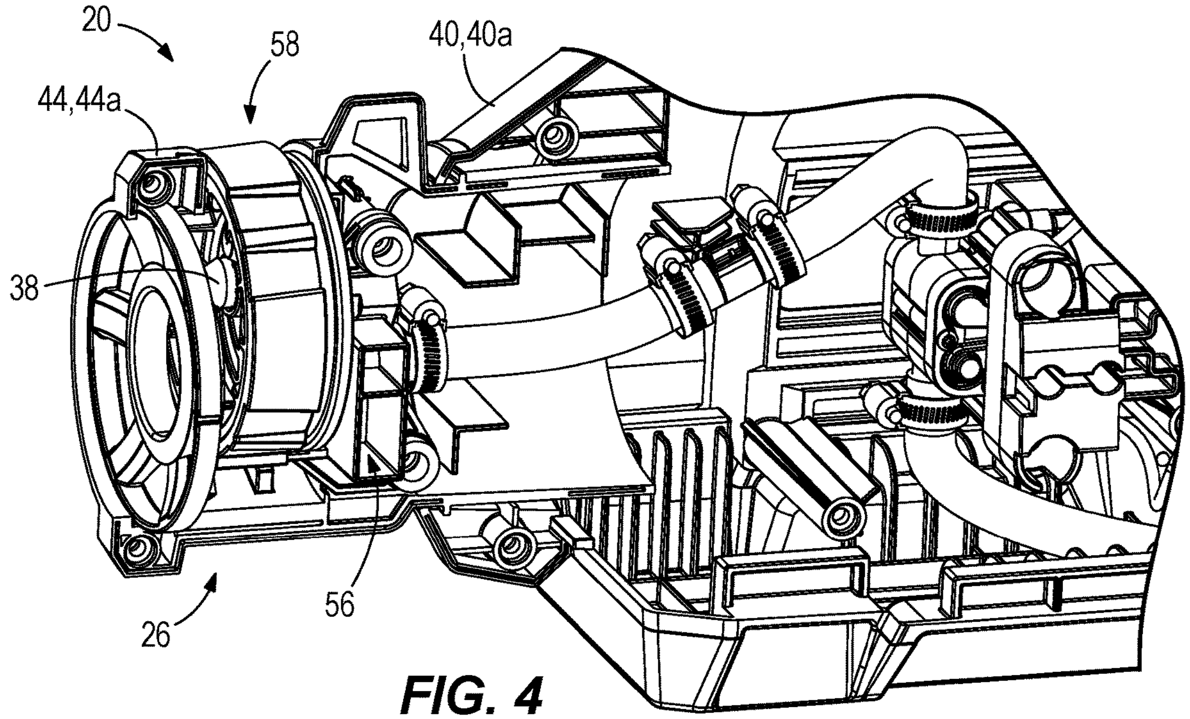
FIG. 4 is a partial perspective view of the sprayer of FIG. 1C with portions removed, illustrating an adjustable nozzle assembly.

FIGS. 2 and 3 illustrate the sprayer 20 in greater detail. The housing 22 includes a main housing 40 formed from a pair of clamshell main housing halves 40*a*, 40*b*, a base housing 42 coupled to the main housing 40, and a nozzle housing 44 coupled to the main housing 40 and formed from a pair of clamshell nozzle housing halves 44*a*, 44*b*. The nozzle housing 44 has a generally tubular shape and supports the adjustable nozzle assembly 26. The main housing 40 includes the battery receptacle 34 that selectively couples to the battery pack 36 to provide DC electrical power to the sprayer 20. In alternative embodiments, the sprayer 20 may be AC powered (e.g., plugged into a standard home electrical socket), gas-powered (e.g., by one or more internal combustion engines), and the like. The main housing 40 also defines the handle portion 32 that the user may grasp during use to manipulate the orientation and position of the sprayer 20.

With reference to FIG. 3, the sprayer 20 includes a motor and pump assembly 46 that includes a pump 48 in fluid communication with the reservoir 24 and with the nozzle assembly 26, and a motor 50 configured to drive the pump 48. The motor and pump assembly 46 is supported within the main housing 40 by damping elements 52 positioned between the motor and pump assembly 46 and walls of the main housing 40 to dampen transmission of vibration therebetween. The handle portion 32 of the main housing 40 supports a trigger 54 configured to selectively activate the motor 50, causing the pump 48 to draw liquid solution from the reservoir 24 and pump the solution toward the nozzle assembly 26 to spray out the solution.

With reference to FIGS. 4-6D, the adjustable nozzle assembly 26 includes a nozzle mount 56 fixedly supported by the nozzle housing 44, and a removable and rotatable wheel assembly 58 removably coupled to the nozzle mount 56. In the embodiment shown in FIG. 5, the wheel assembly 58 supports multiple nozzles 38 including a first nozzle 38*a*, a second nozzle 38*b*, and a third nozzle 38*c* each configured to impart different spray characteristics to the solution sprayed out from the respective nozzle 38*a*-38*c*. In the illustrated embodiment, the nozzles 38*a*-38*c* correspond to different flow rates of the solution sprayed from the nozzle, including a low flow spray, a medium flow spray, and a high flow spray, respectively. However, the nozzles 38*a*-38*c* may be configured to vary other parameters of the spray instead of or in addition to the flow rate, such as the spray pattern, the spray droplet size, the spray velocity, and the like. Although three nozzles 38*a*-38*c* are illustrated, it should be appreciated that the wheel assembly 58 may be configured to support fewer than three nozzles (e.g., two nozzles), or more than three nozzles (e.g., four nozzles, five nozzles, etc.) in a manner similar to that described herein.

Figure 5:
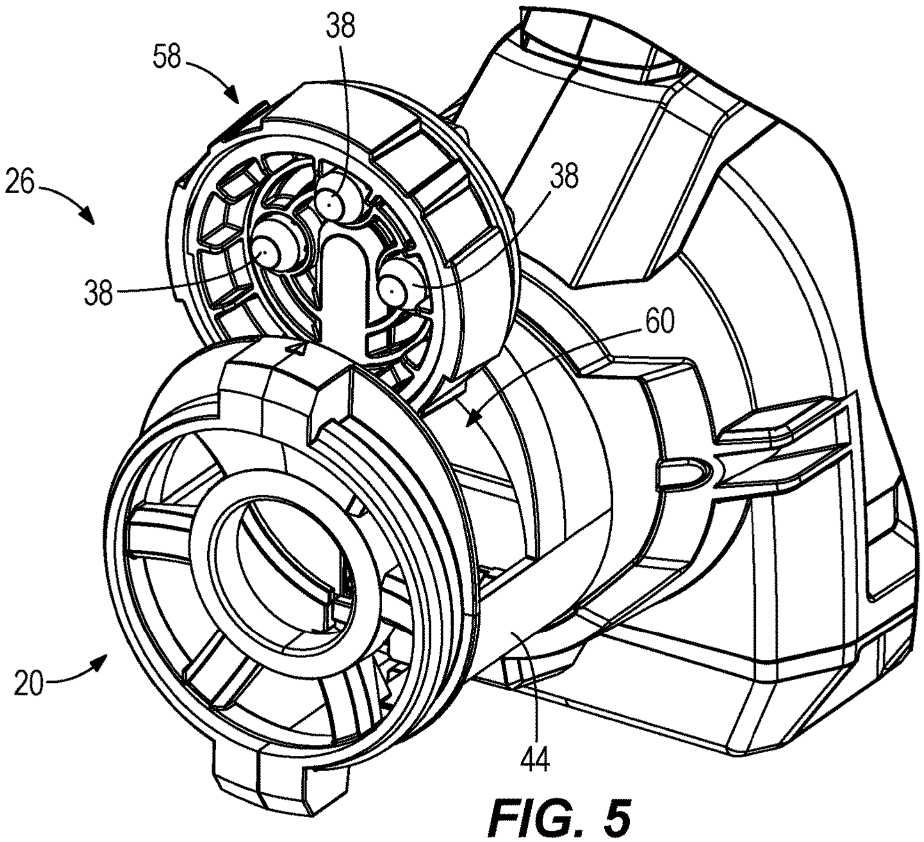
FIG. 5 is a partial perspective view of the sprayer of FIG. 1C with portions removed.

The wheel assembly 58 is selectively removable from the nozzle mount 56 to enable, e.g., cleaning and/or replacement of the nozzles 38*a*-38*c*. As shown in FIG. 5, the nozzle housing 44 defines a wheel slot 60 that provides access to allow the wheel assembly 58 to be decoupled from or recoupled to the nozzle mount 56.

Figure 6A:
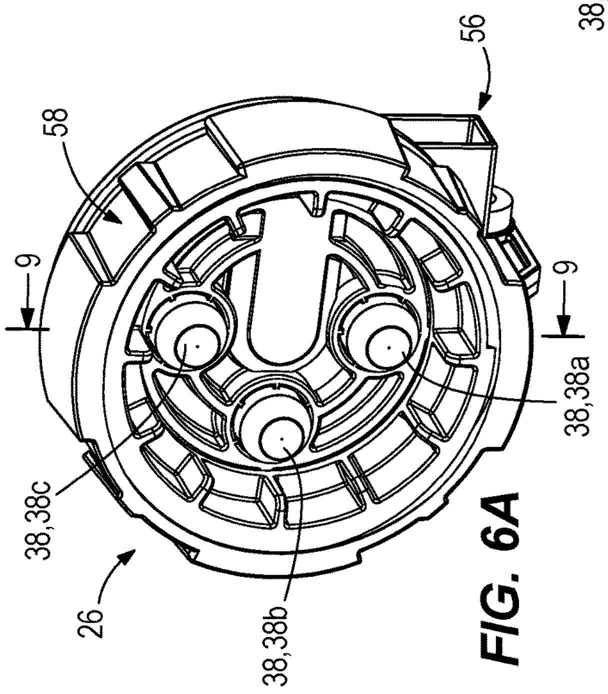
FIGS. 6A-6D are perspective views of the adjustable nozzle assembly of FIG. 4 adjusted to different positions.
Figure 6B:
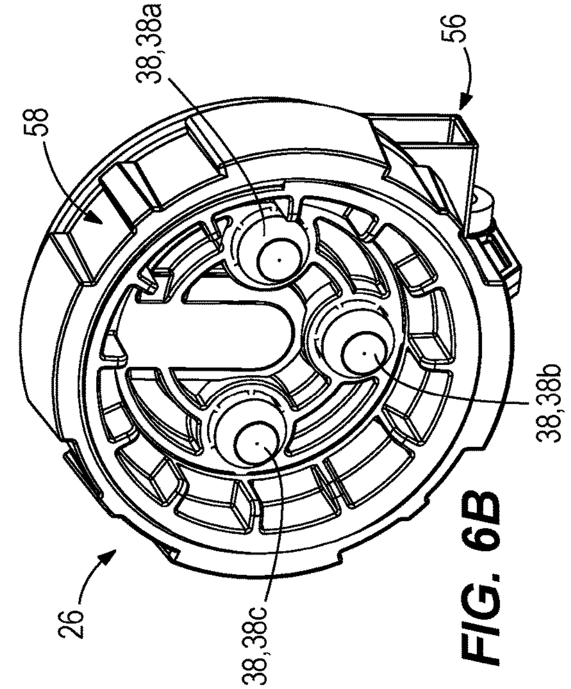
Figure 6C:
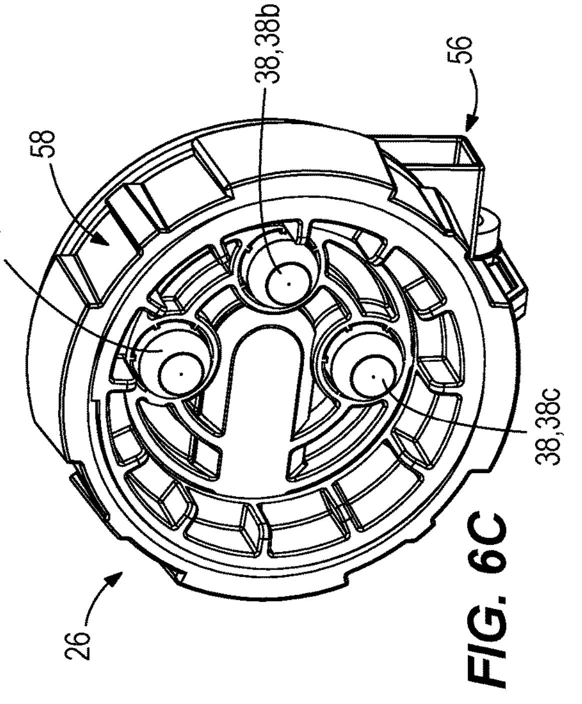
Figure 6D:
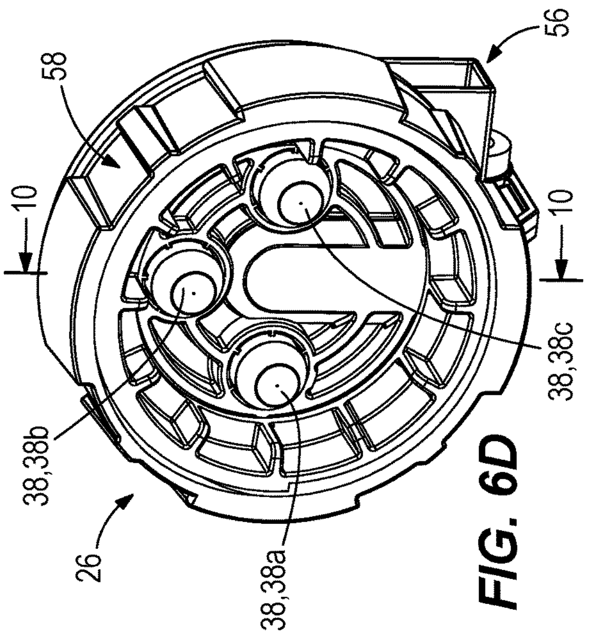

With reference to FIGS. 6A-6D, the wheel assembly 58 is rotatable between different angular positions corresponding to different selections of the nozzles 38*a*-38*c* or removal of the wheel assembly 58. FIG. 6A illustrates the wheel assembly 58 in a first position or low flow position at which the liquid solution flows out from the first nozzle 38*a*. FIG. 6B illustrates the wheel assembly 58 in a second position or medium flow position at which the liquid solution flows out from the second nozzle 38*b*. FIG. 6C illustrates the wheel assembly 58 in a third position or high flow position at which the liquid solution flows out from the third nozzle 38*c*. FIG. 6D illustrates the wheel assembly 58 located in a fourth position or removal position in which the wheel assembly 58 may be removed from the nozzle body 62. When operating the sprayer 20, the user can rotate the wheel assembly 58 to adjust between the first, second, third, and fourth positions to select different nozzles 38*a*-38*c* according to the particular spray characteristics desired, or to remove the wheel assembly 58.

With reference to FIGS. 7-10, the nozzle mount 56 includes a nozzle body 62 and an inlet conduit 64 that extends through the nozzle body 62. The inlet conduit 64 defines an inlet passageway 66 by which liquid solution enters the nozzle assembly 26. The nozzle mount 56 also includes a wheel hub 68 rotatably coupled to the nozzle body 62 by a fastener 70. The wheel hub 68 selectively couples to the wheel assembly 58 to connect the wheel assembly 58 to the nozzle mount 56. The wheel hub 68 is rotatable about an axis 72 defined by the fastener 70. When the wheel assembly 58 is coupled to the wheel hub 68, the wheel assembly 58 also rotates with the wheel hub 68 about the axis 72.

The wheel assembly 58 includes the nozzles 38*a*-38*c*, a generally cylindrical selection wheel 74, a back plate 76 that couples to the selection wheel 74, a retention plate 78 that cooperates with the selection wheel 74 to retain the nozzles 38*a*-38*c* in the wheel assembly 58, and a threaded ring 80 that secures the retention plate 78 to the selection wheel 74. The selection wheel 74 includes a cylindrical sidewall 82, an open forward end 84, and a rear wall 86 that forms a partially closed rearward end 88. The rear wall 86 defines first nozzle apertures 90 that receive O-rings 92 and portions of the nozzles 38*a*-38*c*.

Figure 12:
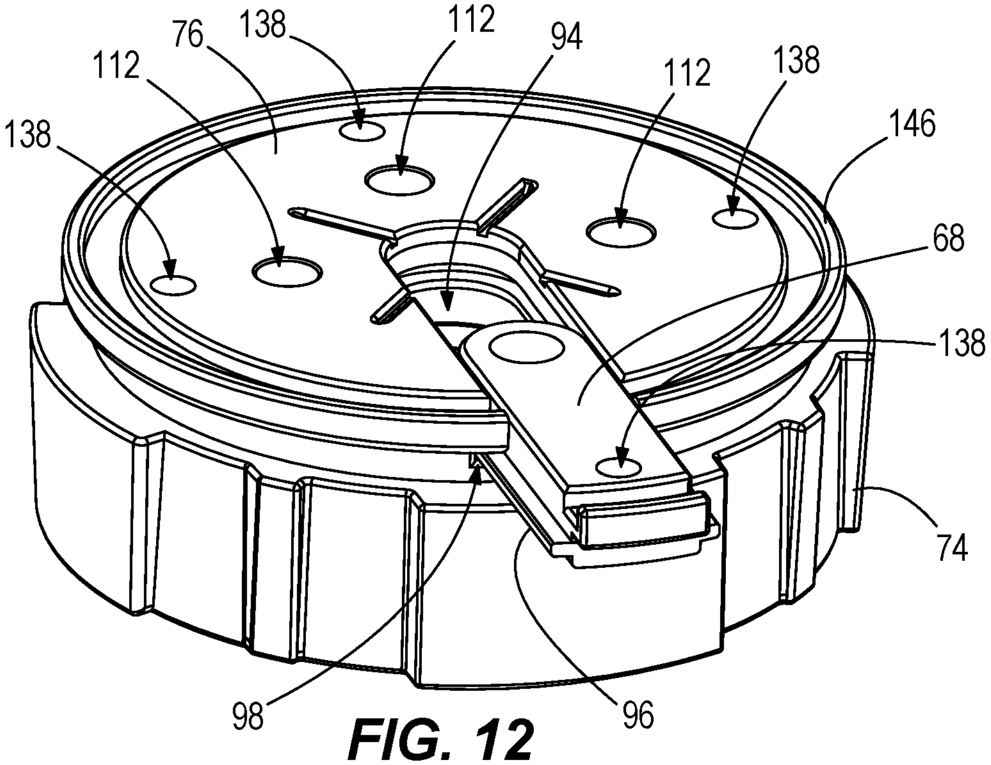
FIG. 12 is an exploded perspective view of portions of the adjustable nozzle assembly of FIG. 4.
Figure 13:
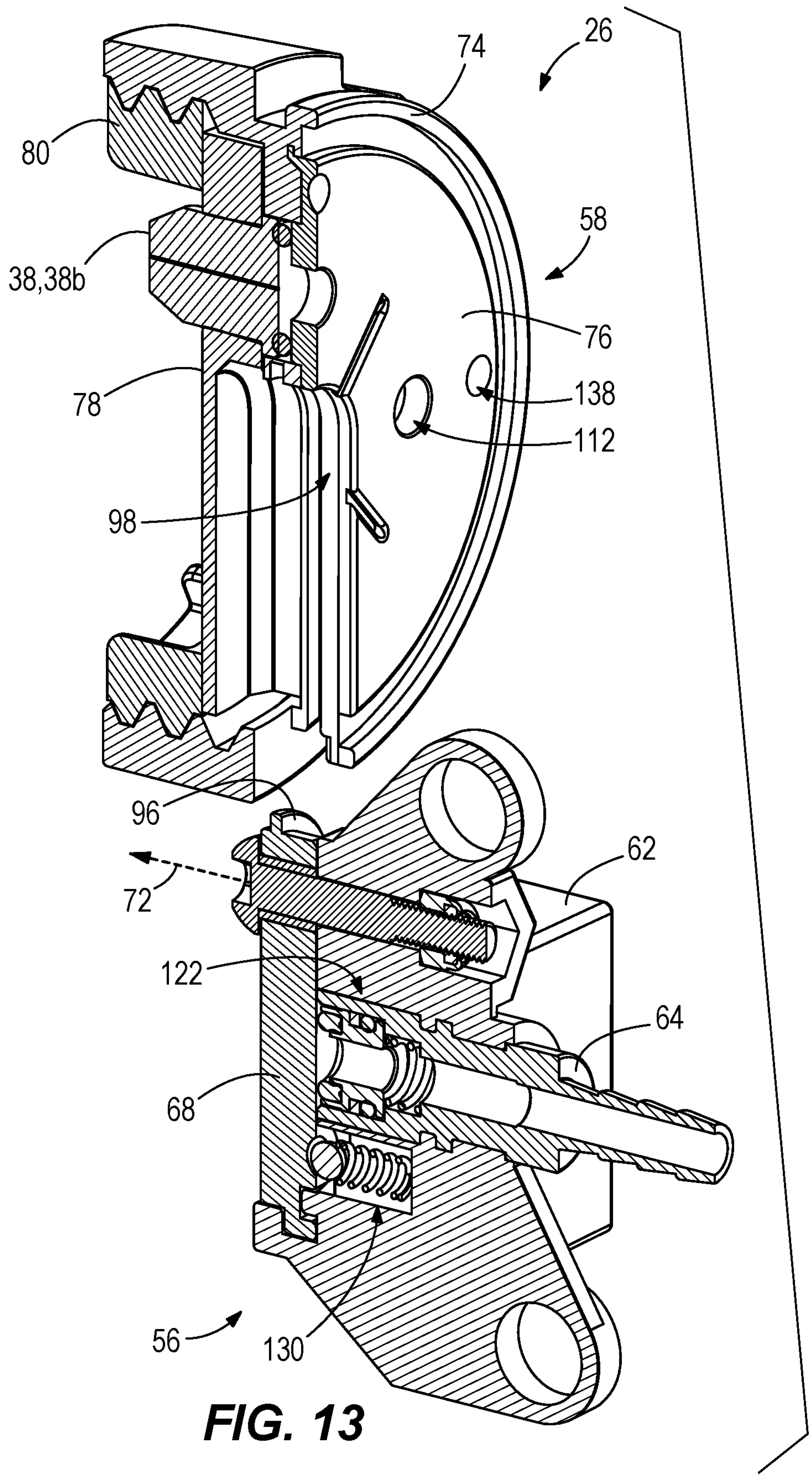
FIG. 13 is an exploded perspective view cross-sectional view of the adjustable nozzle assembly of FIG. 4.

With reference to FIGS. 12 and 13, the rear wall 86 and a portion of the sidewall 82 also define a hub aperture 94 that receives the wheel hub 68 to couple the wheel assembly 58 to the wheel hub 68. Specifically, the wheel hub 68 includes a rib 96 that extends about a portion of an outer periphery of the wheel hub 68, and the selection wheel 74 defines a groove 98 formed about a portion of the hub aperture 94 and configured to receive the rib 96 of the wheel hub 68 to create a tongue-in-groove connection therebetween. To couple the wheel assembly 58 to the nozzle mount 56, the wheel assembly 58 is positioned with the hub aperture 94 generally aligned with the wheel hub 68, and the wheel assembly 58 is slid downward onto the wheel hub 68 such that the wheel hub 68 slides into the hub aperture 94 with the rib 96 sliding into the groove 98.

With reference again to FIGS. 8-10, in the illustrated embodiment, the retention plate 78 is generally disk-shaped and includes second nozzle apertures 100 generally corresponding to the first nozzle apertures 90 of the selection wheel 74. Each second nozzle aperture 100 has a diameter less than a diameter of the corresponding first nozzle aperture 90 formed in the selection wheel 74. The retention plate 78 is received into the selection wheel 74 and abuts a portion of the rear wall 86. The selection wheel 74 includes an internally threaded portion 102 proximate the forward end 84, and the threaded ring 80 includes an externally threaded portion 104 that threads to the internally threaded portion 102 to secure the retention plate 78 against the rear wall 86.

In the illustrated embodiment, the back plate 76 is an insert molded component that is coupled to the selection wheel 74 during the insert molding process. The back plate 76 includes protrusions 106 that are received into a circumferential groove 108 (FIG. 11) formed in the rear wall 86 of the selection wheel 74 to ensure that the back plate 76 remains firmly connected to the selection wheel 74. In other embodiments, the back plate 76 may be formed separately and then coupled to the selection wheel 74 by a snap-fit connection. In such embodiments, the protrusions 106 may comprise snap members that snap-fit into the circumferential groove 108 (FIG. 11) formed in the rear wall 86 of the selection wheel 74. In the illustrated embodiment, the back plate 76 also includes bosses 110 that extend partially into the first nozzle apertures 90 when the back plate 76 is coupled to the selection wheel 74. Each boss 110 defines a third nozzle aperture 112 by which the liquid solution is permitted to flow between the inlet passageway 66 of the inlet conduit 64 and each respective nozzle 38*a*-38*c*. The back plate 76 further defines a hub slot 113 that receives a portion of the wheel hub 68 when the wheel assembly 58 is coupled to the nozzle mount 56.

Figure 11:
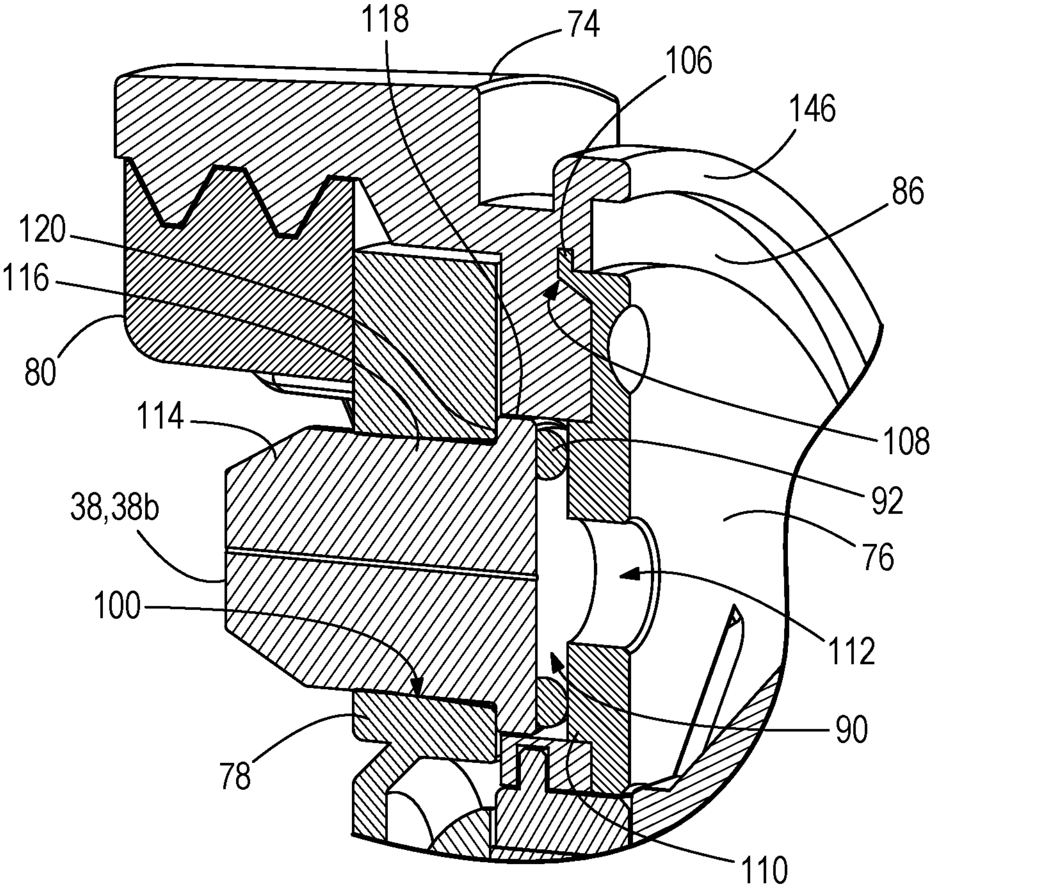
FIG. 11 is a detailed view of the perspective cross-sectional view of FIG. 10.

With reference to FIG. 11, each nozzle 38*a*-38*c* includes a frustoconical front portion 114, a generally cylindrical central portion 116, and a generally cylindrical rear portion 118 having a diameter slightly greater than a diameter of the central portion 116, so that the rear portion 118 forms a shoulder 120 with the central portion 116. Each first nozzle aperture 90 closely receives the rear portion 118 of the corresponding nozzle 38*a*-38*c* (e.g., by non-interference fit). Similarly, each second nozzle aperture 100 closely receives the central portion 116 of the corresponding nozzle 38*a*-38*c* (e.g., by non-interference fit). The retention plate 78 engages the shoulder 120 of each nozzle 38*a*-38*c* to secure the rear portion 118 within the respective first nozzle aperture 90. As such, each O-ring 92 is compressed between the rear portion 118 of the respective nozzle 38*a*-38*c* and the boss 110 of the back plate 76, to form a liquid-tight seal between the respective nozzle 38*a*-38*c* and the corresponding third nozzle aperture 112 of the back plate 76.

Figure 8:
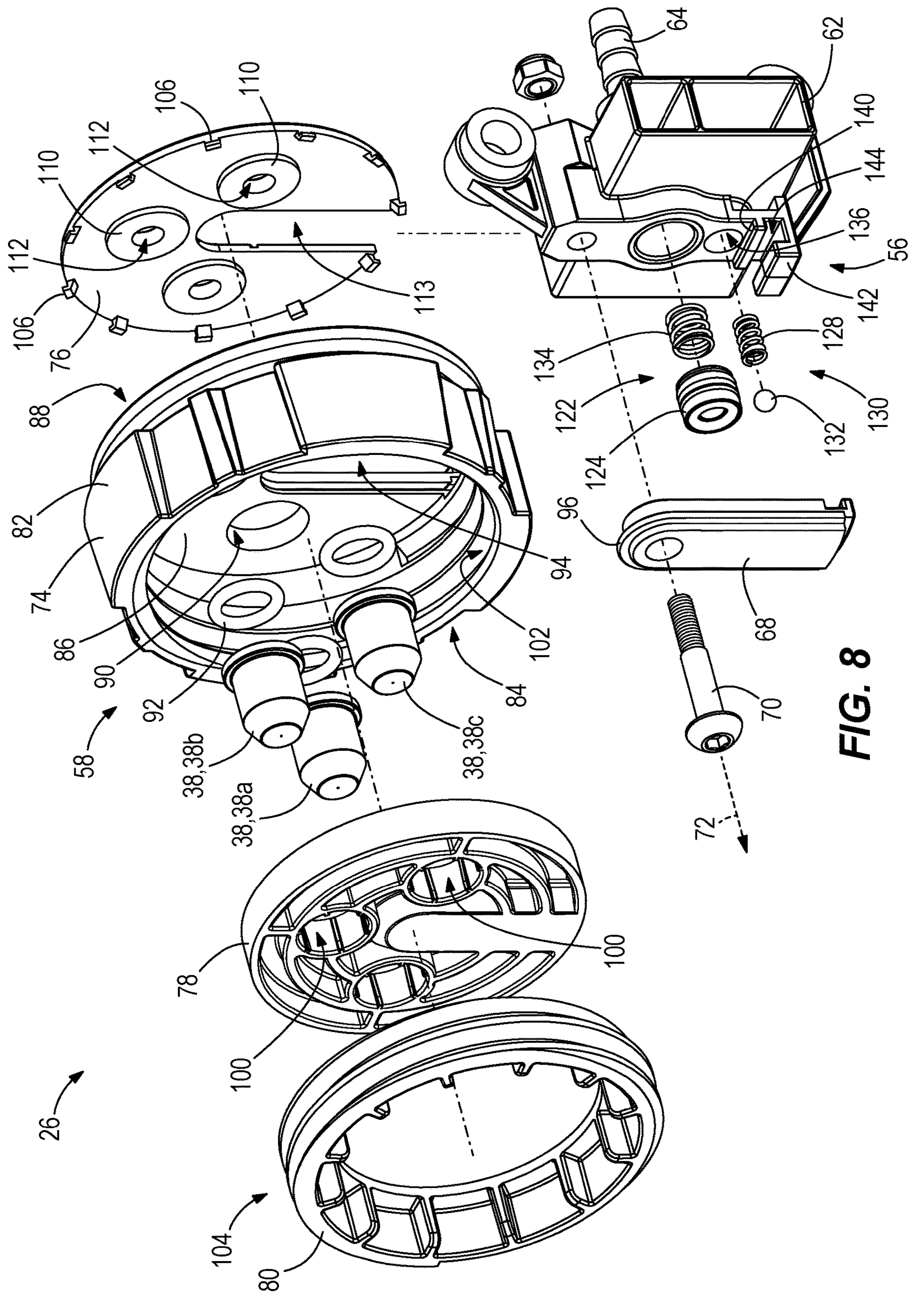
FIG. 8 is an exploded perspective view of the adjustable nozzle assembly of FIG. 4.
Figure 10:
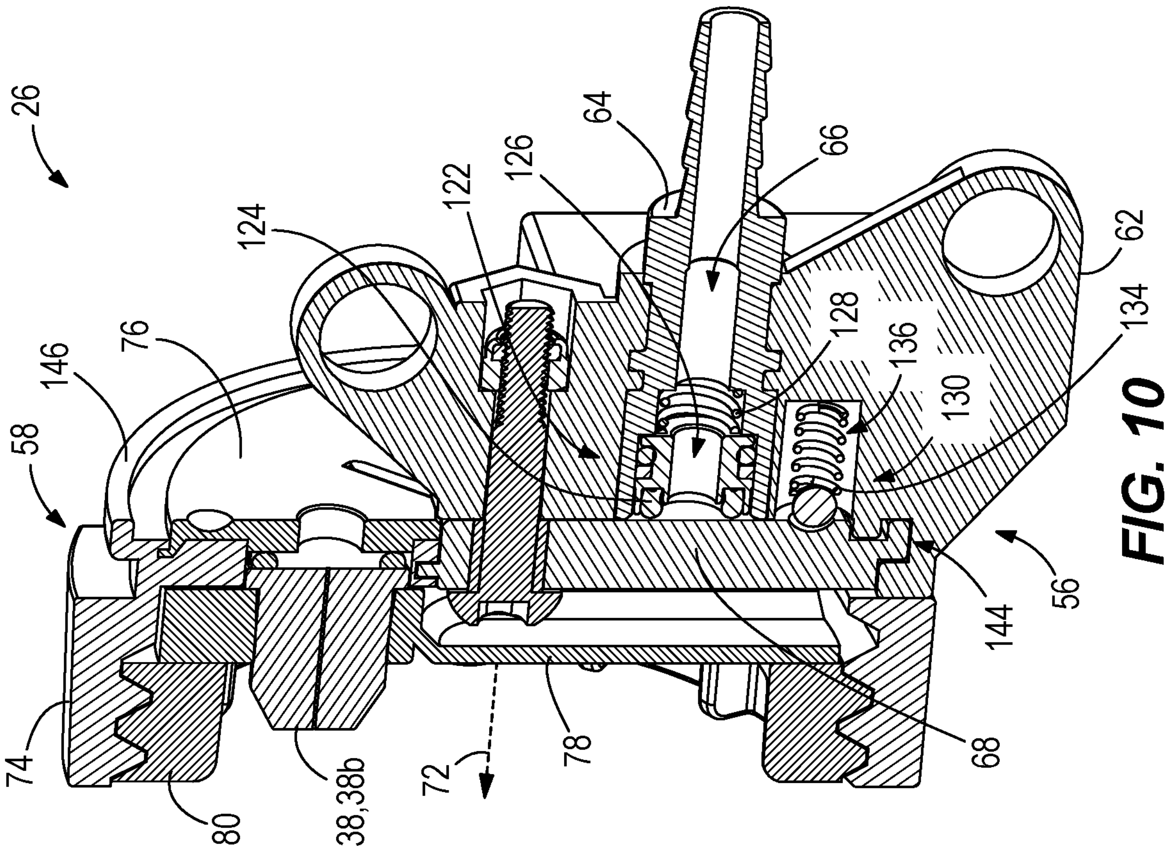
FIG. 10 is a perspective cross-sectional view of the adjustable nozzle assembly of FIG. 4, taken along line 10-10 of FIG. 6D.
Figure 9:
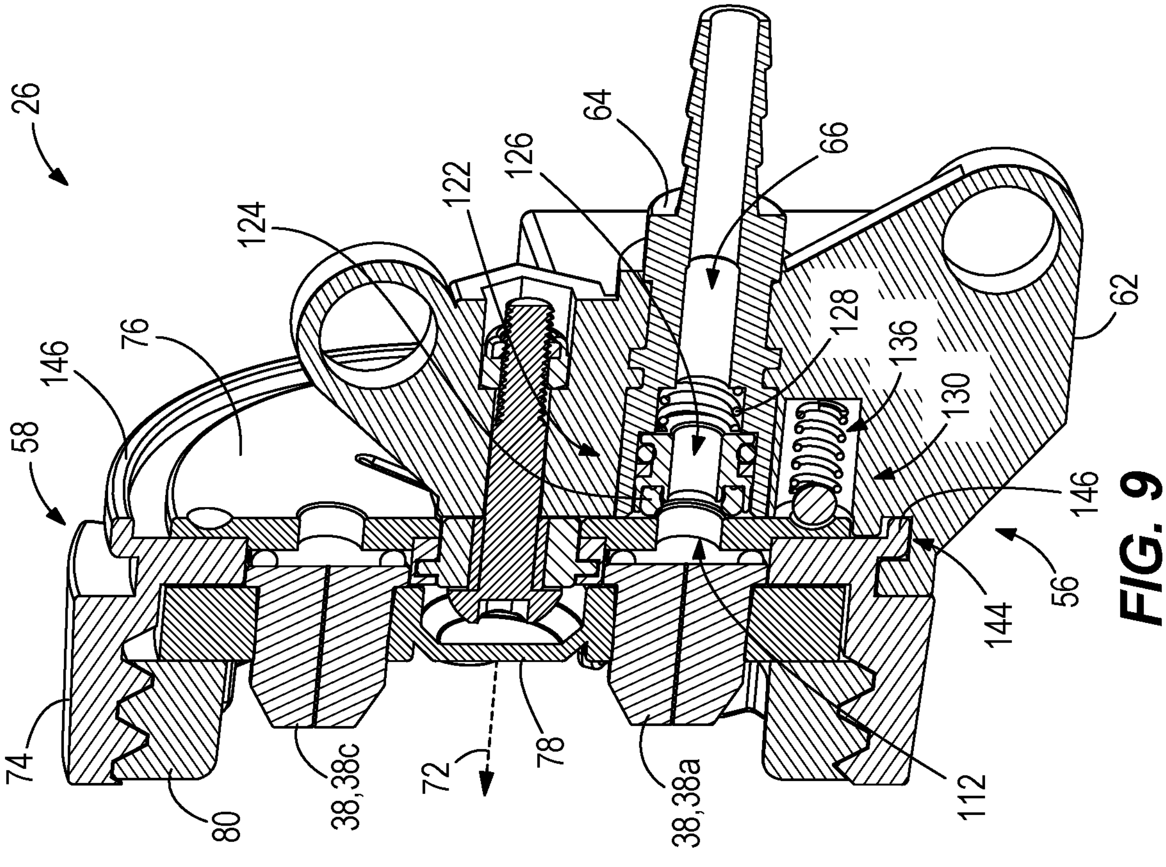
FIG. 9 is a perspective cross-sectional view of the adjustable nozzle assembly of FIG. 4, taken along line 9-9 of FIG. 6A.

With reference to FIGS. 8-10, the nozzle mount 56 also includes a pressure seal assembly 122 that maintains a liquid-tight seal between the inlet conduit 64 and the wheel hub 68, or between the inlet conduit 64 and the selection wheel assembly 58. The pressure seal assembly 122 generally resides within an end portion of the inlet conduit 64 located proximate the wheel hub 68. The pressure seal assembly 122 includes a pressure seal member 124 having a central bore 126 through which liquid solution is permitted to flow, and a pressure seal spring 128 that biases the pressure seal member 124 forwardly toward the wheel hub 68, or toward the selection wheel assembly 58 when the selection wheel assembly 58 is rotated away from the fourth position described above. With reference to FIG. 9, when the selection wheel assembly 58 is rotated between the first, second, and third positions corresponding to the respective nozzles 38*a*-38*c*, the pressure seal member 124 contacts the back plate 76 to create a liquid-tight seal between the back plate 76 and the inlet conduit 64. With reference to FIG. 10, when the selection wheel assembly 58 is rotated to the fourth position at which the wheel hub 68 aligns with the inlet conduit 64, the pressure seal member 124 contacts the wheel hub 68 to create a liquid-tight seal between the wheel hub 68 and the inlet conduit 64. Accordingly, the pressure seal assembly 122 prevents liquid solution from leaking from the nozzle assembly 26 when the selection wheel assembly 58 is removed from the nozzle mount 56.

Figure 7:
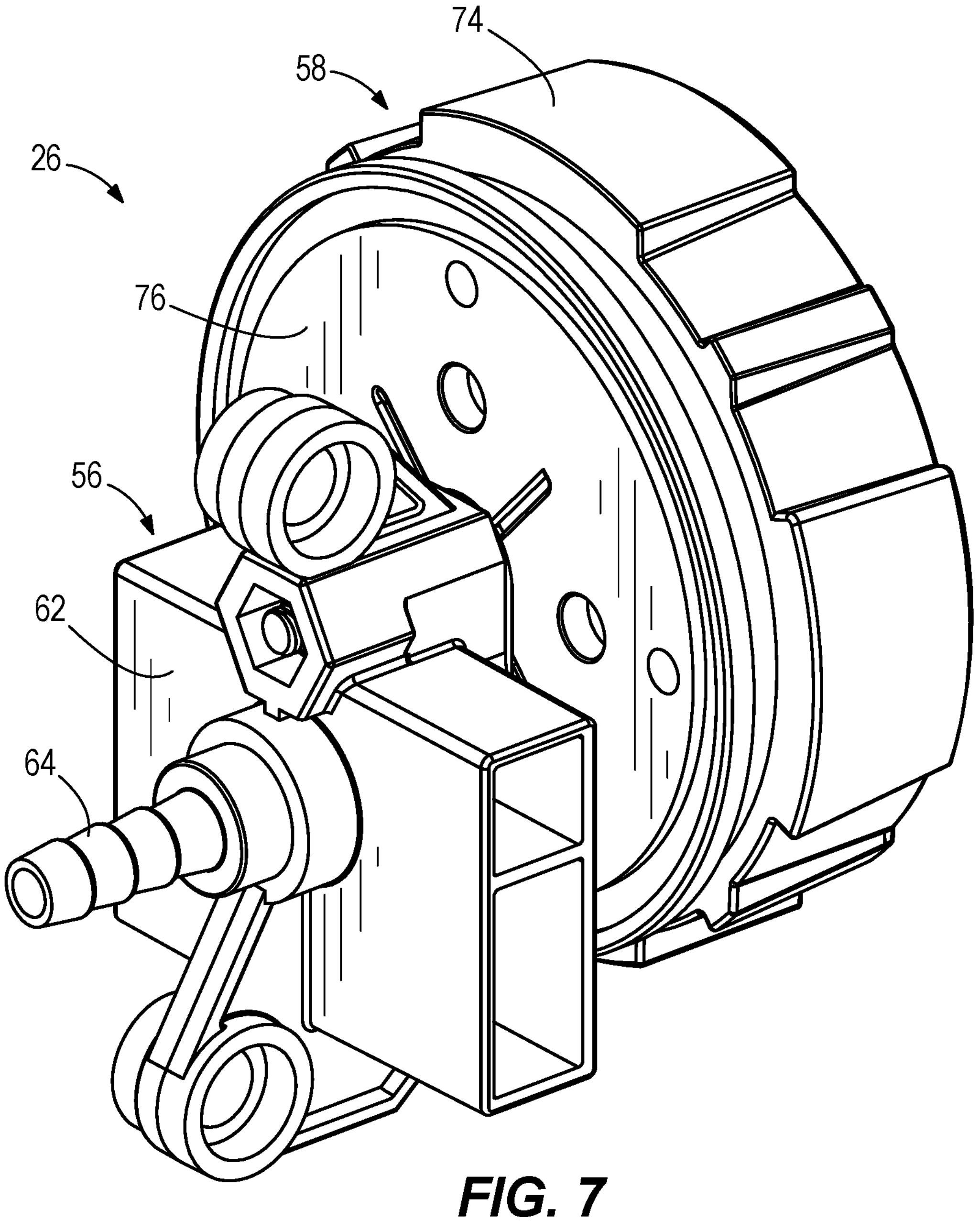
FIG. 7 is another perspective view of the adjustable nozzle assembly of FIG. 4.

With reference to FIGS. 7, 9, and 10, the adjustable nozzle assembly 26 also includes a detent assembly 130 that releasably arrests rotation of the wheel assembly 58 at each of the four rotational positions shown in FIGS. 6A-6D (i.e., the low flow position, the medium flow position, the high flow position, and the removal position). The detent assembly 130 includes a ball 132 and a spring 134 located within a recess 136 formed in the nozzle body 62 adjacent the inlet conduit 64. The wheel assembly 58 includes depressions 138 formed in the back plate 76 and angularly aligned with the nozzles 38*a*-38*c*. Likewise, the wheel hub 68 also includes a depression 138 that aligns with the detent assembly 130 when the wheel assembly 58 is rotated to the fourth position, or release position, shown in FIG. 6D. The spring 134 biases the ball 132 toward the wheel assembly 58 (or, toward the wheel hub 68 at the fourth position of the wheel assembly 58). As the wheel assembly 58 is rotated to each of the four positions shown in FIGS. 6A-6D, the ball 132 engages each respective depression 138 to releasably arrest rotation of the wheel assembly 58 at the respective position. When the user applies sufficient torque to the wheel assembly 58, the biasing force of the spring 134 is overcome and the ball 132 disengages from the respective depression 138, allowing the wheel assembly 58 to be rotated to another position.

With reference to FIGS. 8, and 9, when the wheel assembly 58 is coupled to the nozzle mount 56 and rotated away from the fourth position, or the release position, a portion of the nozzle body 62 engages a portion of the selection wheel 74 to prevent the wheel assembly 58 from being removed. Specifically, the nozzle body 62 includes a first finger 140 and a second finger 142 that define an L-shaped annular groove 144 therebetween. The selection wheel 74 includes an L-shaped annular lip 146 that extends about most of a circumference of the rear wall 86, except for that portion of the circumference that is interrupted by the hub aperture 94. When the wheel assembly 58 is coupled to the wheel hub 68 and rotated away from the fourth position, the lip 146 slides within the groove 144 and engages the first and second fingers 140, 142. This secures the wheel assembly 58 to the nozzle mount 56 and prevents the wheel assembly 58 from being removed from the nozzle mount 56 when the wheel assembly 58 is not located in the fourth, removal position.

In operation, the user adjusts the wheel assembly 58 to the first, second, or third position as desired, and depresses the trigger 54 to activate the motor 50. The motor 50 drives the pump 48 to begin pumping liquid solution from the reservoir 24 toward the adjustable nozzle assembly 26. The solution moving from the pump 48 enters the inlet conduit 64, flows through the pressure seal assembly 122 and the third nozzle aperture 112, and sprays outward from the selected nozzle 38*a*-38*c*. To select a different nozzle 38*a*-38*c*, the user releases the trigger 54, rotates the wheel assembly 58 to another of the first, second, or third positions as desired. To remove the wheel assembly 58, e.g., to clean or replace any of the nozzles 38*a*-38*c*, the user rotates the wheel assembly 58 to the fourth position, i.e., the release position, and pulls the wheel assembly 58 way from the nozzle mount 56 and outward through the wheel slot 60 formed in the nozzle housing 44. The user then re-inserts the wheel assembly 58 by aligning the hub aperture 94 of the selection wheel 74 with the wheel hub 68, and slides the wheel assembly 58 downward onto the wheel hub 68 such that the wheel hub 68 is received into the hub aperture 94. The user then adjusts the wheel assembly 58 from the fourth position to the first, second, or third positions, and continues to operate the sprayer 20 as described above.

Figure 15:
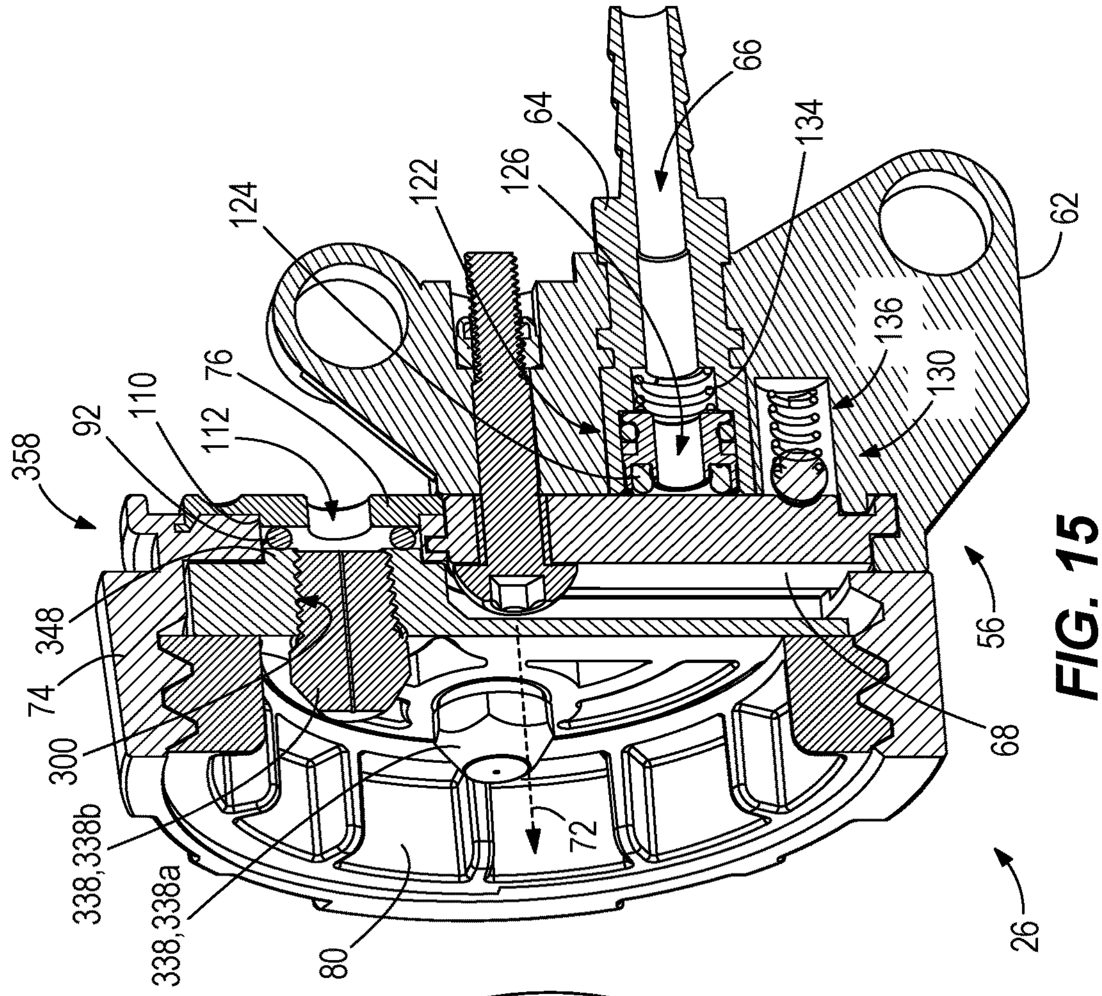
FIG. 15 is a perspective cross-sectional view of the adjustable nozzle assembly of FIG. 14, taken along line 15-15 of FIG. 14.
Figure 14:
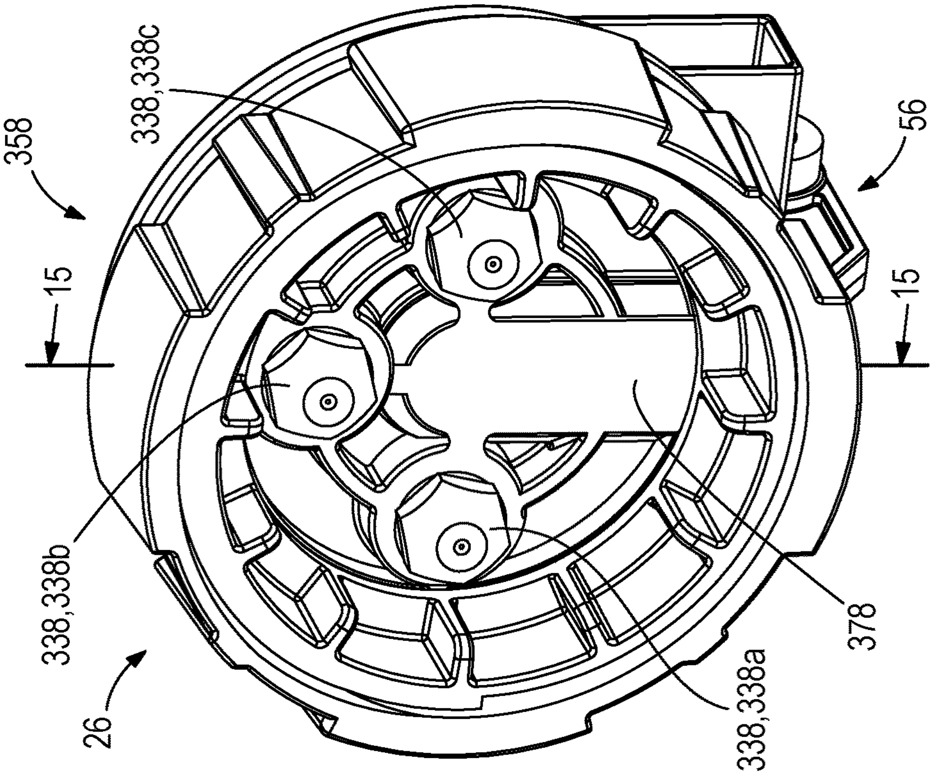
FIG. 14 is a perspective view of an adjustable nozzle assembly according to another embodiment of the disclosure.

FIGS. 14 and 15 illustrate a wheel assembly 358 according to another embodiment of the disclosure. The wheel assembly 358 is substantially similar to the wheel assembly 58 described above in connection with FIGS. 1A-12, and accordingly, the following description will focus on the differences between the wheel assembly 358 and the wheel assembly 58. The wheel assembly 358 includes a modified retention plate 378 having second nozzle apertures 300 that are threaded. The threaded second nozzle apertures 300 receive threaded nozzles 338*a*, 338*b*, 338*c*. The modified retention plate 378 also includes bosses 348 that partially extend into each respective first nozzle aperture 90. The bosses 348 compress the O-rings 92 against the bosses 110 of the back plate 76 to create a liquid-sealed flow path between the third nozzle apertures 112 of the back plate 76 and each respective nozzle 338*a*-338*c*. The modified retention plate 378 can be interchangeable with the retention plate 78 described above, such that either retention plate 78, 378 may be utilized with the adjustable nozzle assembly 26 to enable use of the threaded nozzles 338*a*-338*c* or the non-threaded nozzles 38*a*-38*c*, as desired.

Figure 16:
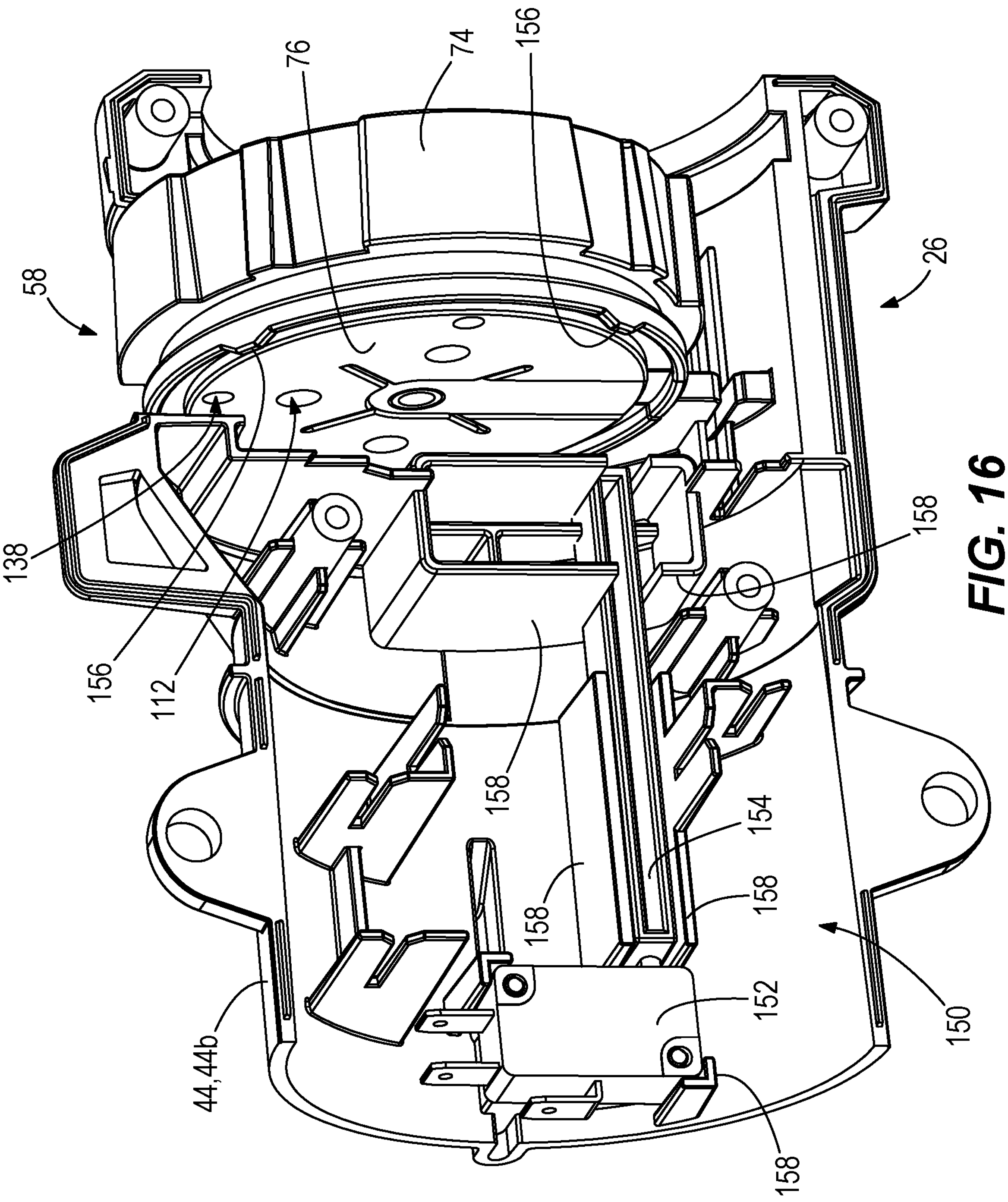
FIG. 16 is a perspective view of portions of the sprayer of FIG. 1C, illustrating a switch assembly.
Figure 17:
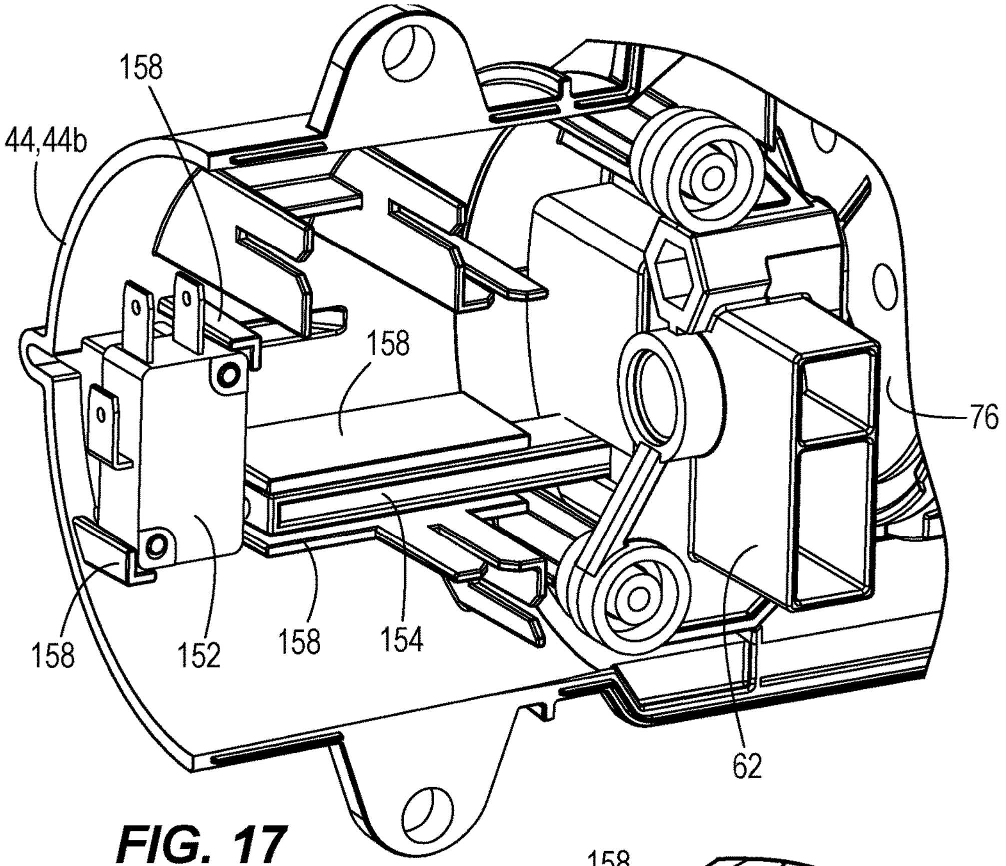
FIG. 17 is another perspective view of portions of the sprayer of FIG. 1C.
Figure 18:
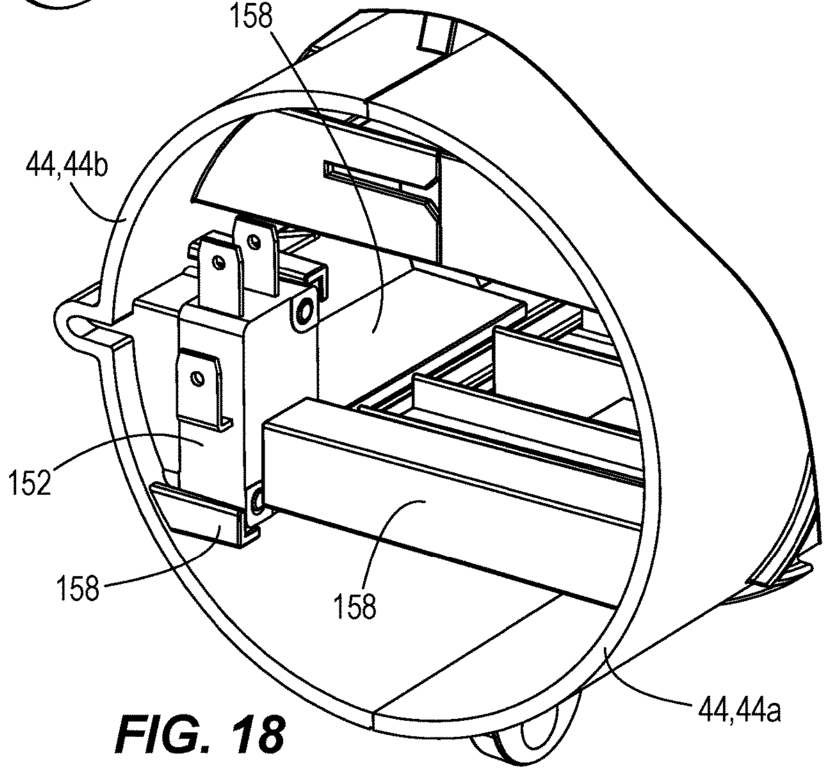
FIG. 18 is another perspective view of portions of the sprayer of FIG. 1C.

With reference to FIGS. 16-18, in some embodiments of the sprayer 20, the adjustable nozzle assembly 26 also includes a switch assembly 150 supported within the nozzle housing 44. The switch assembly 150 is operable to prevent the sprayer 20 from being operated when the wheel assembly 58 is not located in one of the first, second, or third positions, i.e., when none of the nozzles 38*a*-38*c* is aligned with the inlet conduit 64. The switch assembly 150 includes a switch 152 and a switching bar 154 extending between the switch 152 and the wheel assembly 58. The wheel assembly 58 includes actuation bumps 156 that protrude axially away from the lip 146 of the selection wheel 74. The actuation bumps 156 are angularly spaced about a circumference of the selection wheel 74 and positioned to align with the switching bar 154 when the wheel assembly 58 is rotationally located in one of the first, second, or third positions described above. In the illustrated embodiment, actuation bumps 156 and the switching bar 154 are chamfered to allow for smooth cam action as the wheel assembly 58 is rotated.

In the embodiment shown in FIGS. 16-18, the nozzle housing halves 44*a*, 44*b* include rib features 158 that capture and support the switching bar 154 and the switch 152 within the nozzle housing 44.

In operation, when the wheel assembly 58 is rotated away from the first, second, or third positions, such that none of the nozzles 38*a*-38*c* align with the inlet conduit 64, the switch 152 is open and the motor 50 of the sprayer 20 cannot be activated. When the wheel assembly 58 is adjusted to one of the first, second, or third positions, such that one of the nozzles 38*a*-38*c* aligns with the inlet conduit 64, the corresponding actuation bump 156 engages the switching bar 154 to displace the bar 154 rearward. As the switching bar 154 displaces rearward, the switching bar 154 engages the switch 152 to close the switch 152, thus permitting the motor 50 (FIG. 3) to be activated by the user to spray the solution as desired. When the wheel assembly 58 is again rotated away from the first, second, or third position, the switch 152 itself functions as a return mechanism to displace the switching bar 154 forward, so that the switch 152 is open and operation of the sprayer 20 is again prevented.

FIGS. 19-26 illustrate a portable, battery-powered liquid sprayer 420 including an adjustable nozzle assembly 426 according to another embodiment of the disclosure. The sprayer 420 is similar to the sprayer 20 described above and includes much of the same structure as the sprayer 20. Features and elements of the sprayer 420 that are similar to the features and elements of the sprayer 20 are assigned the same reference numerals "plus 400." It should be understood that the features of the sprayer 420 that are not explicitly described below have the same properties as the features of the sprayer 20.

Figure 19:
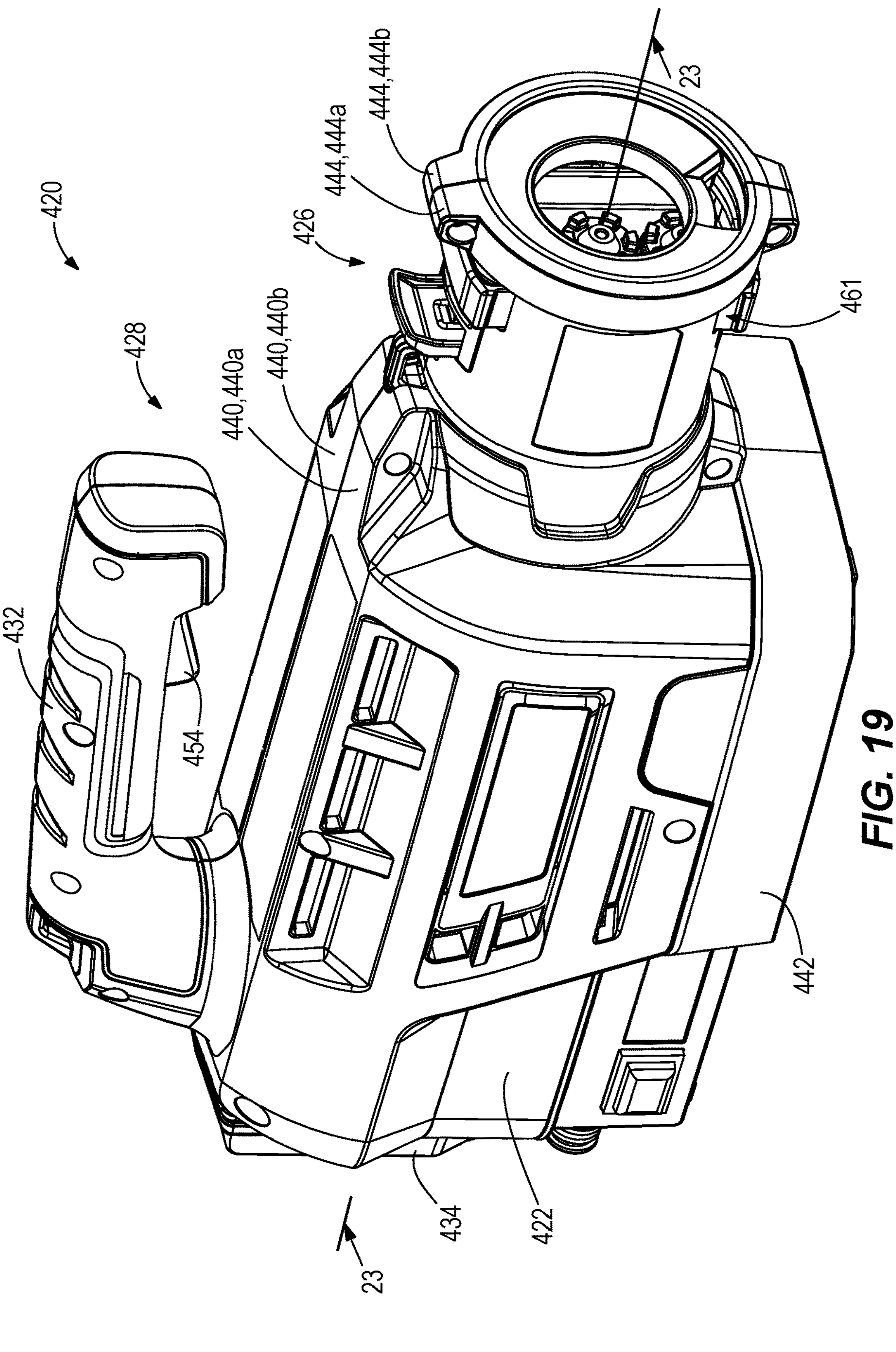
FIG. 19 is a perspective view of a portable, battery-powered liquid sprayer according to another embodiment of the disclosure.
Figure 20:
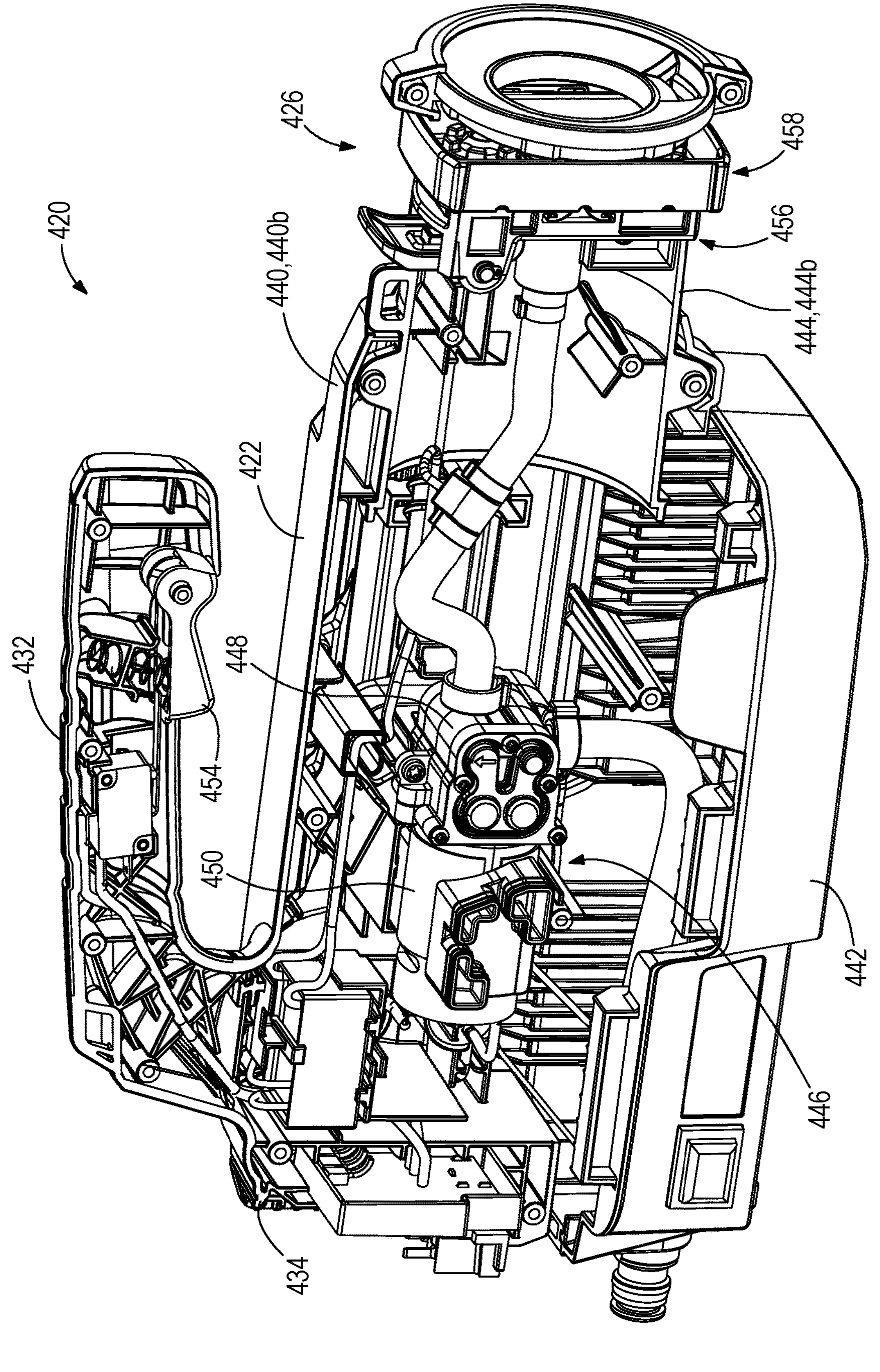
FIG. 20 is another perspective view of the sprayer of FIG. 19 with portions removed.

With reference to FIGS. 19 and 20, the sprayer 20 includes a housing 422, a reservoir (not shown) to hold a liquid solution (e.g., a disinfecting solution), and an adjustable nozzle assembly 426 to spray out the solution. The reservoir can be a removable reservoir (i.e., like the removable reservoir 24 described above with respect to the sprayer 10), an integrated reservoir affixed to the housing 422 (i.e., like the integrated reservoir 24 of the sprayer 15), or a remote reservoir that fluidly connects to a sprayer unit 428 of the sprayer 420 via a hose (i.e., like the remote reservoir 24 of the sprayer 20). The housing 422 defines a handle portion 432 and a battery receptacle 434 that selectively couples to a removable and rechargeable battery pack (not shown). As will be discussed in further detail below, the nozzle assembly 426 of each sprayer 420 is an adjustable and removable nozzle assembly 426 that allows the user to switch between different nozzles 438 (FIG. 21 A), each imparting different spray characteristics to the spray (e.g., differing by flow rate, spray pattern, spray droplet size, etc.).

The housing 422 includes a main housing 440 formed from a pair of clamshell main housing halves 440*a*, 440*b*, a base housing 442 coupled to the main housing 440, and a nozzle housing 444 coupled to the main housing 440 and formed from a pair of clamshell nozzle housing halves 444*a*, 444*b*. The nozzle housing 444 has a generally tubular shape and supports the adjustable nozzle assembly 426. The main housing 440 also defines the handle portion 432 that the user may grasp during use to manipulate the orientation and position of the sprayer 420.

With reference to FIG. 20, the sprayer 420 includes a motor and pump assembly 446 that includes a pump 448 in fluid communication with the reservoir and with the nozzle assembly 426, and a motor 450 configured to drive the pump 448. The handle portion 432 of the main housing 440 supports a trigger 454 configured to selectively activate the motor 450, causing the pump 448 to draw liquid solution from the reservoir and pump the solution toward the nozzle assembly 426 to spray out the solution.

Figures 21A, 21B, 21C:
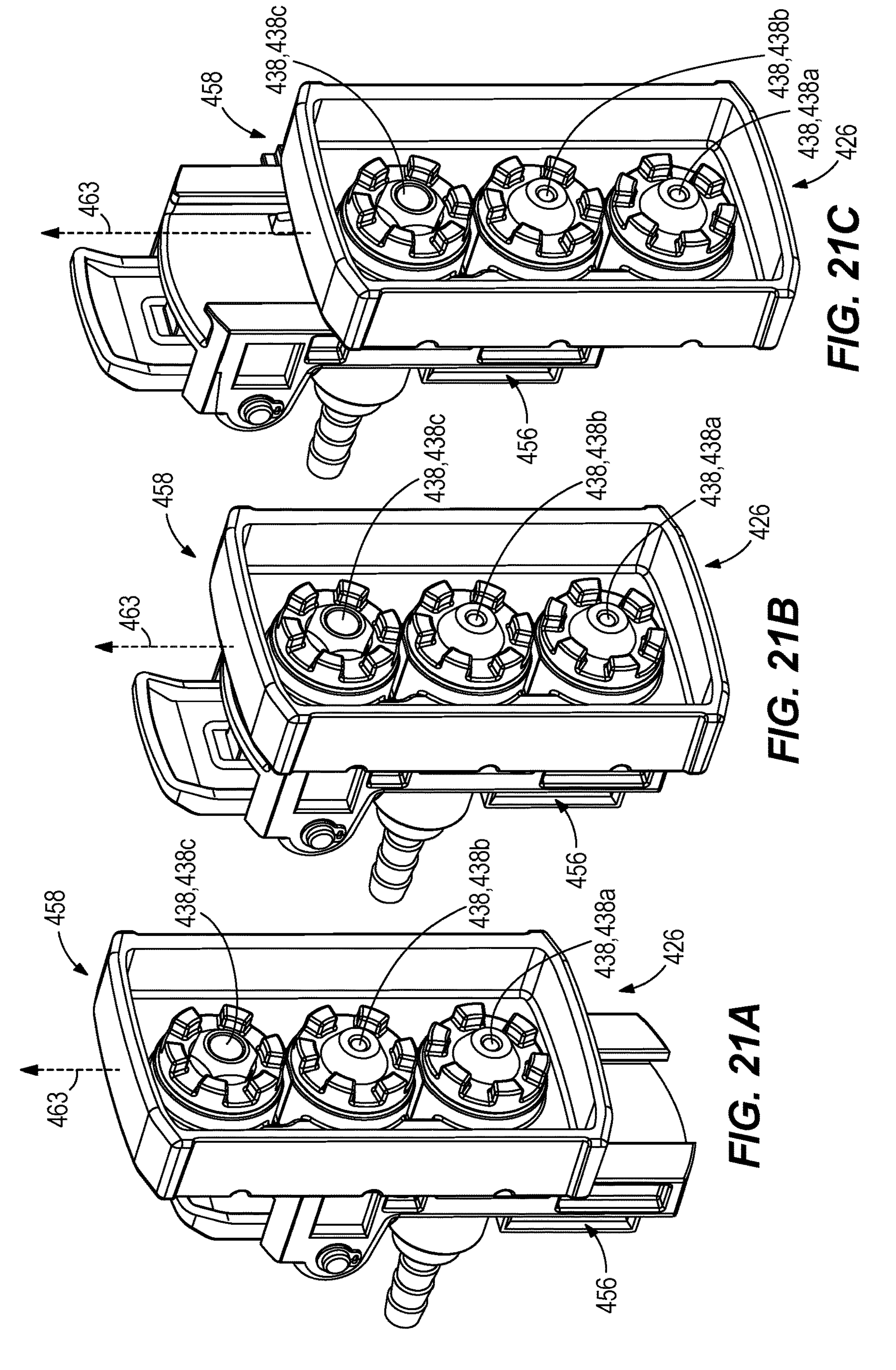
FIGS. 21A-21C are perspective views of an adjustable nozzle assembly of the sprayer of FIG. 19 adjusted to different positions.

With reference to FIGS. 20-21C, the adjustable nozzle assembly 426 includes a nozzle mount 456 fixedly supported by the nozzle housing 444, and a removable, slidable nozzle brick 458 coupled to the nozzle mount 456. In the illustrated embodiment, the nozzle brick 458 supports multiple nozzles 438 including a first nozzle 438*a*, a second nozzle 438*b*, and a third nozzle 438*c* each configured to impart different spray characteristics to the solution sprayed out from the respective nozzle 438*a*-438*c*. In the illustrated embodiment, the nozzles 438*a*-438*c* correspond to different flow rates of the solution sprayed from the nozzle, including a low flow spray, a medium flow spray, and a high flow spray, respectively. However, the nozzles 438*a*-438*c* may be configured to vary other parameters of the spray instead of or in addition to the flow rate, such as the spray pattern, the spray droplet size, the spray velocity, and the like. Although three nozzles 438*a*-438*c* are illustrated, it should be appreciated that the nozzle brick 458 may be configured to support fewer than three nozzles (e.g., two nozzles), or more than three nozzles (e.g., four nozzles, five nozzles, etc.) in a manner similar to that described herein.

Figure 23:
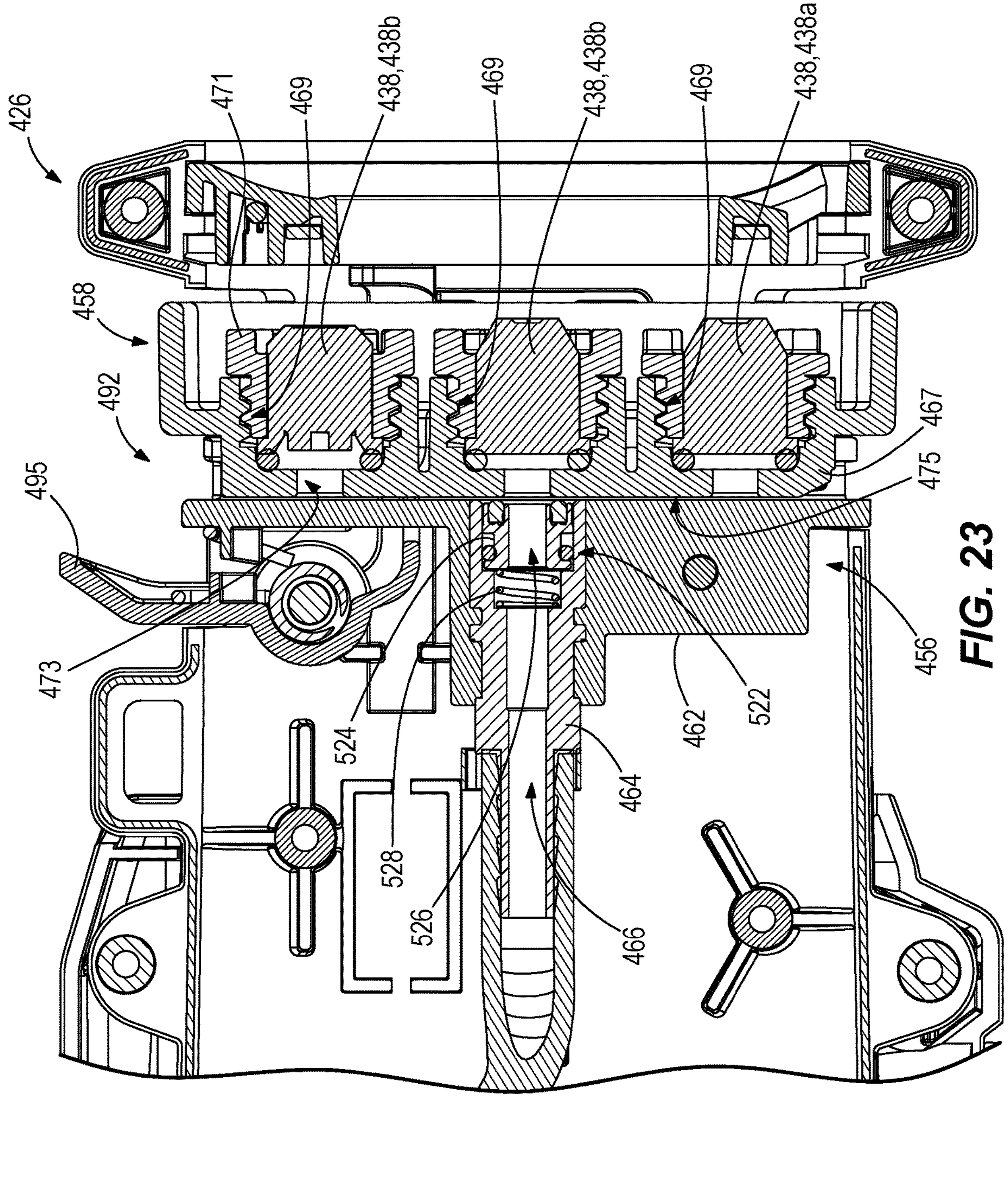
FIG. 23 is a partial cross-sectional view of the sprayer of FIG. 19, taken along line 23-23 of FIG. 19.

The nozzle brick 458 is selectively removable from the nozzle mount 456 to enable, e.g., cleaning and/or replacement of the nozzles 438*a*-438*c*. As shown in FIGS. 19 and 23, the nozzle housing 444 defines an upper slot or first slot 460 that provides access to allow the nozzle brick 458 to be decoupled from the nozzle mount 456 and removed from the nozzle housing 444. The nozzle housing 444 also defines a lower slot or second slot 461 located opposite the first slot 460. The first and second slots 460, 461 provide access to the nozzle brick 458 and space for the nozzle brick 458 to travel as it is slid upward or downward (i.e., along a direction of a longitudinal axis 463 of the nozzle brick 458) to adjust between the different nozzles 438*a*-438*c*.

With reference to FIGS. 21A-21C, the nozzle brick 458 is slidable relative to the nozzle mount 456 between different discrete positions corresponding to different selections of the nozzles 438*a*-438*c*. FIG. 21A illustrates the nozzle brick 458 in a first position or low flow position at which the liquid solution flows out from the first nozzle 438*a*. FIG. 21B illustrates the nozzle brick 458 in a second position or medium flow position at which the liquid solution flows out from the second nozzle 438*b*. FIG. 21C illustrates the nozzle brick 458 in a third position or high flow position at which the liquid solution flows out from the third nozzle 438*c*. When operating the sprayer 420, the user can press upward or downward on the nozzle brick 458 to slide the nozzle brick 458 between the first, second, and third positions to select different nozzles 438*a*-438*c* according to the particular spray characteristics desired.

With reference to FIGS. 22-25, the nozzle mount 456 includes a nozzle body 462 and an inlet conduit 464 that extends through the nozzle body 462 and defines an inlet passageway 466 by which liquid solution enters the nozzle assembly 426. The nozzle body 462 defines a slide track 465 that receives a connection portion 467 of the nozzle brick 458 to slidably couple the nozzle brick 458 to the nozzle mount 456.

The nozzle brick 458 defines a plurality of nozzle apertures 469 that each receive a respective nozzle 438*a*-438*c*. In the illustrated embodiment, the nozzle apertures 469 are vertically aligned along the longitudinal axis 463 and internally threaded. Each nozzle 438*a*-438*c* is received into a nozzle aperture 469 and secured therein by a retaining member 471 (FIG. 23). In the illustrated embodiment, the retaining members 471 are provided as castle nuts 471 having external threads and a central opening that receives a portion of the corresponding nozzle 438*a*-438*c*. In other embodiments (not shown), the nozzle retaining members can be provided as other structures (e.g., a circlip, a snap-fit retainer, a plate, etc.), or the nozzles can be threaded, or can be press-fit into the nozzle apertures 469. Each castle nut 471 tightens into the nozzle aperture 469 and clamps against a shoulder formed on the respective nozzle 438*a*-438*c*. O-rings 492 are provided inside the nozzle apertures 469 and compressed between each nozzle 438*a*-438*c* and a bottom of the nozzle aperture 469 to form a liquid-tight seal. The nozzle brick 458 further includes flow channels 473 that fluidly connect each respective nozzle aperture 469 with an outer surface 475 of the connection portion 467.

Figure 25:
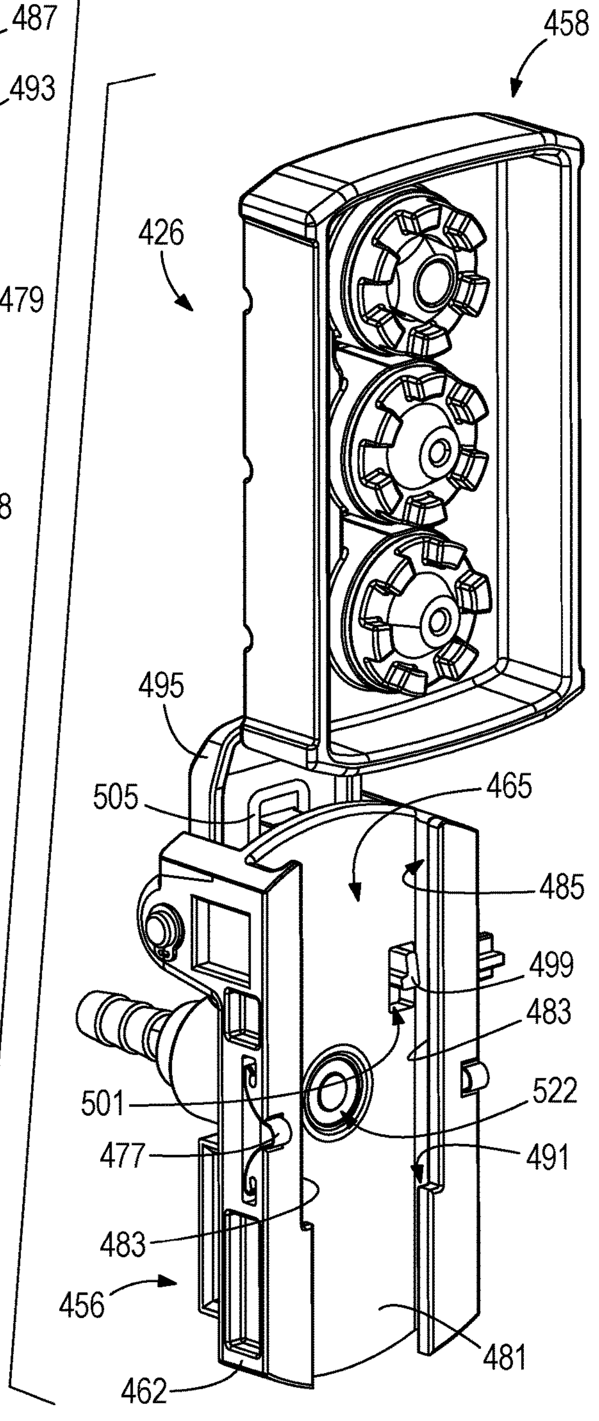

With continued reference to FIG. 23, the nozzle mount 456 also includes a pressure seal assembly 522 that maintains a liquid-tight seal between the inlet conduit 464 and the outer surface 475 of the connection portion 467 of the nozzle brick 458. The pressure seal assembly 522 generally resides within an end portion of the inlet conduit 464 that opens to the slide track 465 (FIG. 25). The pressure seal assembly 522 includes a pressure seal member 524 (FIG. 23) having a central bore 526 through which liquid solution is permitted to flow, and a pressure seal spring 528 that biases the pressure seal member 524 forwardly toward the nozzle brick

458. When the selection nozzle brick 458 slides between the first, second, and third positions corresponding to the respective nozzles 438a-438c, the pressure seal member 524 contacts the outer surface 475 of the connection portion 467 to create a liquid-tight seal between the connection portion 467 and the inlet conduit 464.

Figure 22:
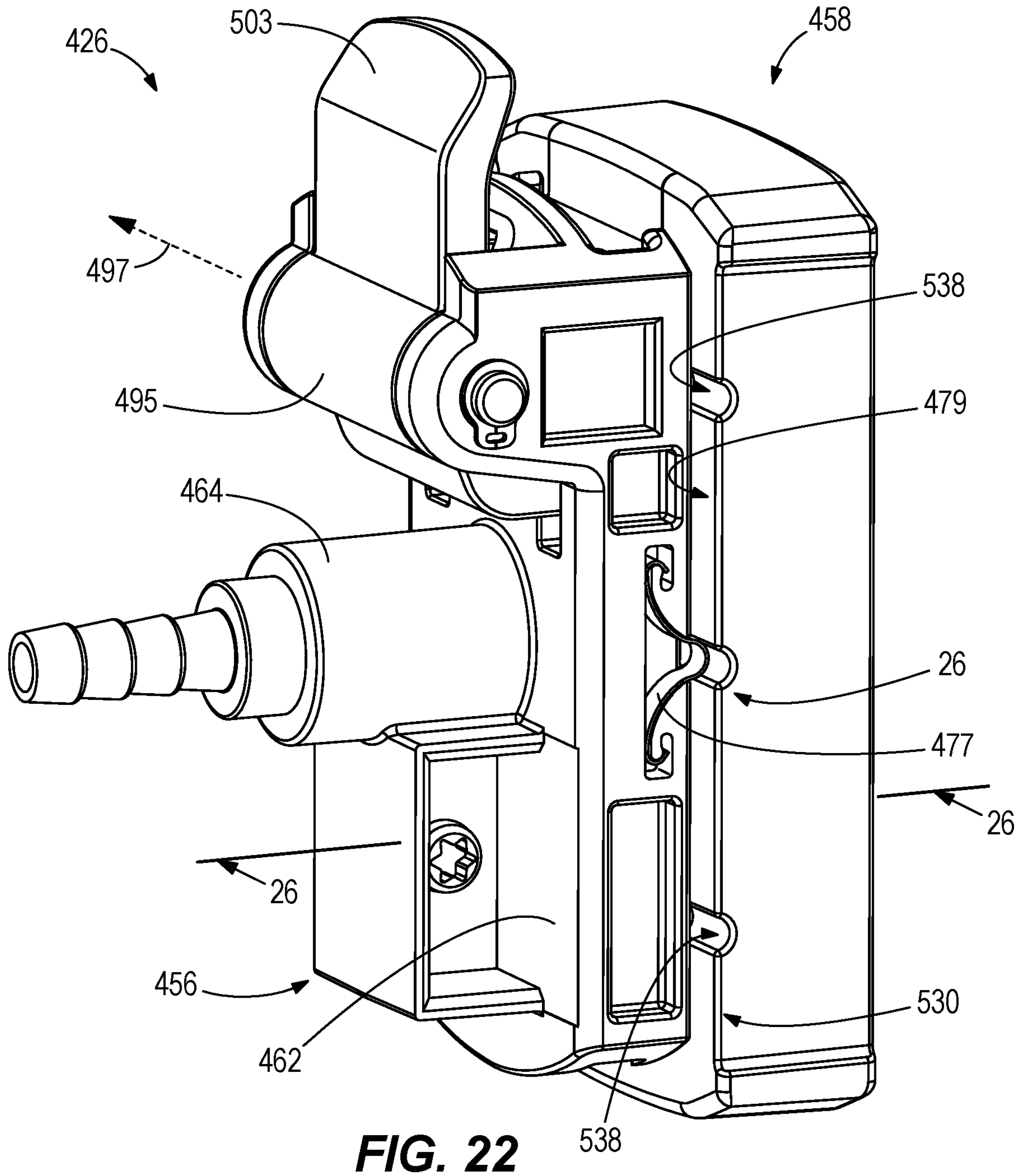
FIG. 22 is a rear perspective view of the adjustable nozzle assembly of FIG. 21A.
Figure 24:
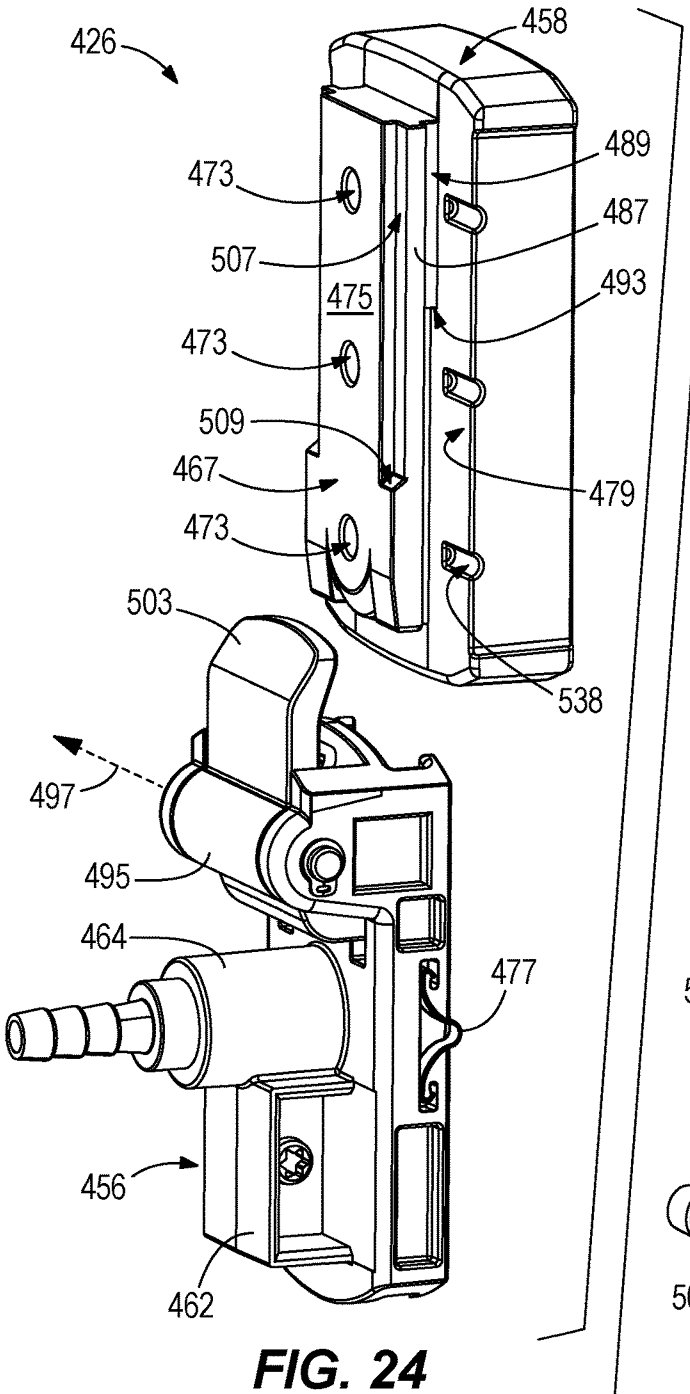
FIGS. 24 and 25 are partially exploded perspective views of the adjustable nozzle assembly of FIG. 21A.

With reference to FIGS. 22 and 24, the adjustable nozzle assembly 426 also includes a detent assembly 530 that releasably secures the nozzle brick 458 at each of the three positions (shown in FIGS. 21A-21C, i.e., the low flow position, the medium flow position, and the high flow position). The detent assembly 530 includes a detent member 477 supported by the nozzle body 462 and a plurality of depressions 538 defined in a rear surface 479 of the nozzle brick 458. In the illustrated embodiment, the detent member 477 is provided as a pair of leaf springs 477 supported on each lateral side of the nozzle body 462 and protruding toward the nozzle brick 458. The depressions 538 are formed in the rear surface 479 on each lateral side of the nozzle brick 458 and respectively aligned with each of the three nozzles 438a-438c. When the nozzle brick 458 is located in the first, second, or third position, the leaf springs 477 engage the corresponding depressions 538 to releasably hold the nozzle brick 458 at the desired position. When the user applies sufficient upward or downward force to the nozzle brick 458, the spring force of the leaf springs 477 is overcome and the leaf springs 477 disengage from the respective depressions 538, allowing the nozzle brick 458 to slide to another position or to be removed from the nozzle mount 456.

Figure 26:
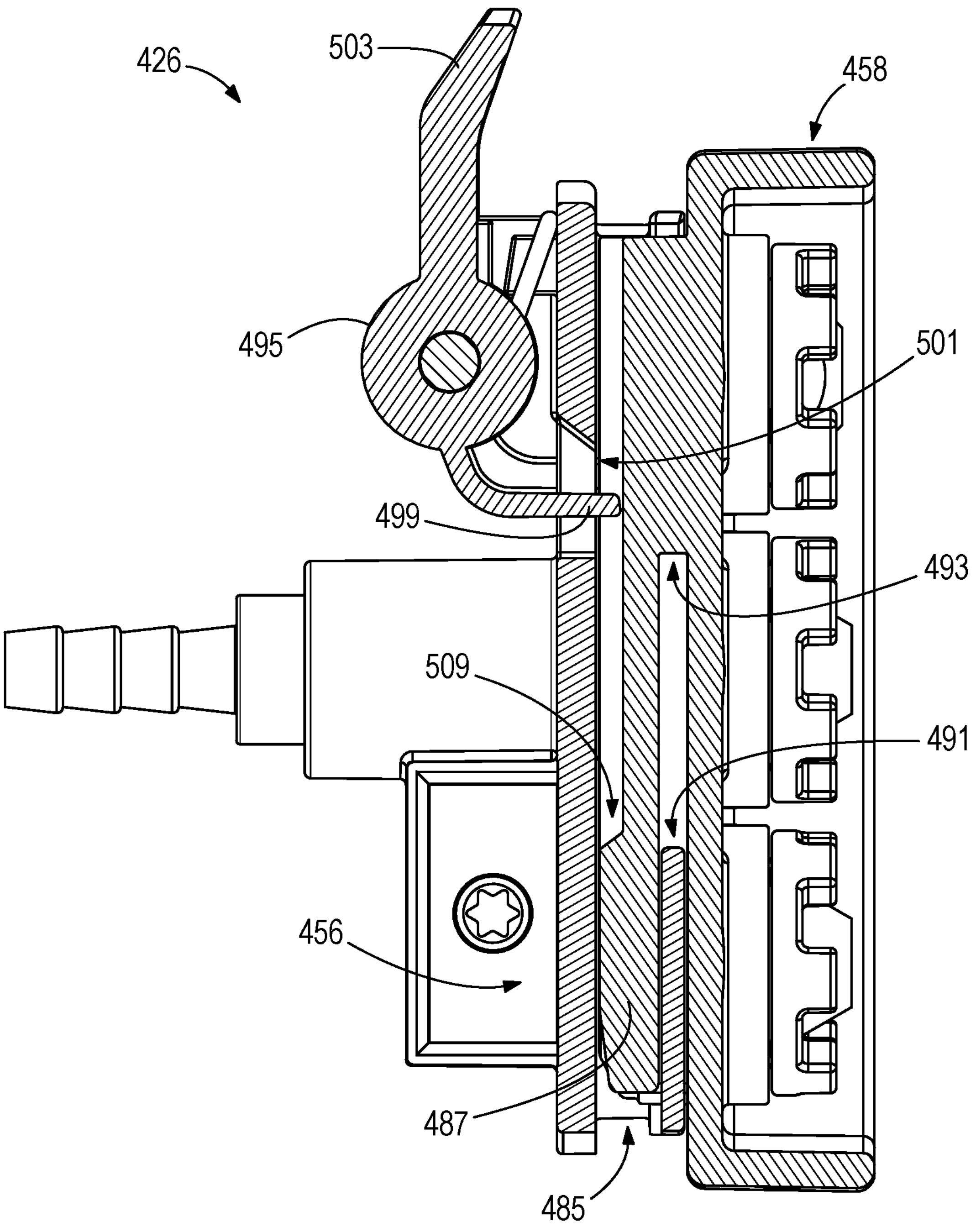
FIG. 26 is a cross-sectional view of the adjustable nozzle assembly of FIG. 21A, taken along line 26-26 of FIG. 22.

With reference to FIGS. 24-26, the nozzle body 462 includes a base wall 481 that partially defines the slide track 465, and a pair of first rails 483 extending longitudinally in a sliding direction and projecting laterally inward toward a center of the slide track 465. The first rails 483 are spaced apart from the base wall 481 such that a pair of first channels 485 are defined respectively between the base wall 481 and each first rail 483. The connection portion 467 of the nozzle brick 458 includes a corresponding pair of second rails 487 that extend longitudinally and project laterally outward from the connection portion 467. The second rails 487 are spaced apart from the rear surface 479 of the nozzle brick 458 such that a pair of second channels 489 are defined respectively between the rear surface 479 and each second rail 487. When the connection portion 467 is received into the slide track 465, the first rails 483 are received into and slide within the second channels 489, and the second rails 487 are received into and slide within the first channels 485.

Each first rail 483 of the nozzle body 462 includes a first stop shoulder 491, and each second channel 489 of the connection portion 467 includes a second stop shoulder 493. When the nozzle brick 458 is slid downward to the third, lowermost position, the first stop shoulders 491 contact the second stop shoulders 493 and prevent the nozzle brick 458 from sliding downward beyond the third position.

The nozzle mount 456 also includes a release lever 495 coupled to the nozzle body 462 and actuable to release the nozzle brick 458 from the slide track 465. The release lever 495 is pivotable about a pivot axis 497 between a locking position in which the nozzle brick 458 is prevented from being removed from the slide track 465 and a release position in which the nozzle brick 458 is permitted to slide upward and out of the slide track 465. The release lever 495 includes a pair of locking arms 499 extending forwardly through arm apertures 501 defined in the base wall 481 and into the slide track 465. The release lever 495 also includes a handle 503 that can be pressed by the user to move the release lever 495 from the locking position to the release position. A torsion spring 505 biases the release lever 495 toward the locking position, in which the locking arms 499 extend into respective locking grooves 507 defined at each lateral edge of the connection portion 467 of the nozzle brick 458. Each locking groove 507 terminates in a third stop shoulder 509. When the release lever 495 is in the locking position and the nozzle brick 458 is slid upward to the first position, the third stop shoulder 509 contacts the corresponding locking arm 499 such that the locking arms 499 prevent the nozzle brick 458 from sliding beyond the first position and out of the slide track 465. To remove the nozzle brick 458 from the nozzle mount 456, the user presses the handle 503 to move the release lever 495 to the release position, in which the locking arms 499 retract out of the locking grooves 507. With the locking arms 499 retracted, the third stop shoulders 509 are permitted to freely slide upward past the locking arms 499 and the nozzle brick 458 can be removed from the nozzle mount 456.

In some embodiments of the sprayer 420, the adjustable nozzle assembly 426 can include a switch assembly like the switch assembly 150 described above with respect to FIGS. 16-18, that is operable to prevent the sprayer 420 from being operated when the nozzle brick 458 is not located in one of the first, second, or third positions. This helps to prevent the sprayer 420 from leaking solution when the nozzle brick 458 is misaligned or removed.

Various features of the disclosure are set forth in the following claims.

What is claimed is:

1. A fluid sprayer comprising:

a housing including a trigger configured to selectively activate a motor;

a reservoir;

a pump fluidly connected to the reservoir; and an adjustable nozzle assembly positioned downstream from the pump and configured to receive fluid discharged by the pump, the adjustable nozzle assembly including a nozzle mount fixedly supported by the housing and including a conduit in fluid communication with the pump, a wheel assembly rotatably coupled to the nozzle mount, the wheel assembly including a selection wheel, a first nozzle coupled to the selection wheel, and a second nozzle coupled to the selection wheel, the wheel assembly being rotatable between a first position at which the first nozzle is located in fluid communication with the conduit, and a second position at which the second nozzle is located in fluid communication with the conduit, and a switch assembly configured to selectively permit or prevent operation of the pump;

wherein the wheel assembly engages and actuates the switch assembly in response to being rotated to the first position or the second position to permit operation of the pump, and wherein the switch assembly prevents operation of the pump when the wheel assembly is rotated out of the first position or the second position to disengage the switch assembly.

2. The fluid sprayer of claim 1, wherein the wheel assembly includes a plurality of actuation protrusions, each actuation protrusion being configured to actuate the switch assembly when the wheel assembly is located at the first position or the second position.

3. The fluid sprayer of claim 2, wherein the switch assembly includes a switch and a slidable switching bar extending between the switch and the wheel assembly, and wherein when the wheel assembly is located in the first position, one of the actuation protrusions displaces the switching bar to actuate the switch.

4. The fluid sprayer of claim 3, wherein when the wheel assembly is located in the second position, another of the actuation protrusions displaces the switching bar to actuate the switch.

5. The fluid sprayer of claim 1, wherein the housing comprises a main housing and a tubular nozzle housing coupled to the main housing, wherein the adjustable nozzle assembly is supported within the tubular nozzle housing, and wherein the tubular nozzle housing defines a nozzle slot and the wheel assembly is removable from the nozzle mount via the nozzle slot.

6. The fluid sprayer of claim 5, wherein the switch assembly prevents operation of the pump when the wheel assembly is removed from the nozzle mount.

7. A fluid sprayer comprising:

a housing;

a reservoir;

a pump fluidly connected to the reservoir; and an adjustable nozzle assembly positioned downstream from the pump and configured to receive fluid discharged by the pump, the adjustable nozzle assembly including a nozzle mount fixedly supported by the housing, the nozzle mount including a nozzle body, a conduit in fluid communication with the pump, and a wheel hub rotatably coupled to the nozzle body and rotatable relative to the nozzle body about an axis, and a wheel assembly removably coupled to the wheel hub and rotatable with the wheel hub about the axis, the wheel assembly including a selection wheel, a first nozzle coupled to the selection wheel, and a second nozzle coupled to the selection wheel, the wheel assembly being rotatable about the axis between a first position at which the first nozzle is located in fluid communication with the conduit, a second position at which the second nozzle is located in fluid communication with the conduit, and a third position at which the conduit is closed by the wheel hub;

wherein when the wheel assembly is located in the third position, the wheel assembly is removable from the nozzle mount in a direction transverse to the axis without any axial movement along the axis.

8. The fluid sprayer of claim 7, wherein the housing comprises a main housing and a tubular nozzle housing coupled to the main housing, and wherein the adjustable nozzle assembly is supported within the tubular nozzle housing.

9. The fluid sprayer of claim 8, wherein the tubular nozzle housing defines a nozzle slot and the wheel assembly is removable from the nozzle mount via the nozzle slot.

10. The fluid sprayer of claim 7, wherein the wheel assembly further includes a retention plate defining a plurality of nozzle apertures that receive the first nozzle and the second nozzle, and wherein the selection wheel includes an open end that receives the retention plate.

11. The fluid sprayer of claim 10, wherein the selection wheel includes a cylindrical sidewall that defines an internally threaded portion, and wherein the wheel assembly further includes a threaded ring having an externally threaded portion that threads to the internally threaded portion to secure the retention plate within the selection wheel.

* * * * *